United States Patent
Zoso et al.

(10) Patent No.: US 9,281,745 B2
(45) Date of Patent: Mar. 8, 2016

(54) DIGITAL CONTROLLER FOR SWITCH-MODE DC-DC CONVERTERS AND METHOD

(71) Applicants: Luciano Zoso, Chandler, AZ (US); Allan P. Chin, Gilbert, AZ (US)

(72) Inventors: Luciano Zoso, Chandler, AZ (US); Allan P. Chin, Gilbert, AZ (US)

(73) Assignee: STELLAMAR LLC, Chandler, AZ (US)

( * ) Notice: Subject to any disclaimer, the term of this patent is extended or adjusted under 35 U.S.C. 154(b) by 202 days.

(21) Appl. No.: 14/067,733

(22) Filed: Oct. 30, 2013

(65) Prior Publication Data

US 2014/0117955 A1     May 1, 2014

Related U.S. Application Data

(60) Provisional application No. 61/796,041, filed on Nov. 1, 2012.

(51) Int. Cl.
    *H02M 3/157*     (2006.01)
    *H02M 1/00*     (2007.01)

(52) U.S. Cl.
    CPC ...... *H02M 3/157* (2013.01); *H02M 2001/0012* (2013.01)

(58) Field of Classification Search
    CPC ............. H02M 2001/0012; H02M 3/156; H02M 3/157; H02M 3/1588; H02M 3/33515
    See application file for complete search history.

(56) References Cited

U.S. PATENT DOCUMENTS

| | | | |
|---|---|---|---|
| 7,498,787 B2 | 3/2009 | Leung et al. | |
| 7,554,308 B2 | 6/2009 | Roh et al. | |
| 8,212,700 B2 | 7/2012 | Zoso | |
| 2005/0285584 A1* | 12/2005 | Kwan | 323/283 |
| 2006/0007032 A1 | 1/2006 | Marino et al. | |
| 2008/0204290 A1* | 8/2008 | Parayandeh et al. | 341/143 |
| 2008/0303501 A1 | 12/2008 | Prodic | |

(Continued)

OTHER PUBLICATIONS

Roh J. et al.: "Digital PWM Controller for DC-DC Converters With Minimum Analogue Circuits" IEEE Electronics Letters, vol. 39, No. 19, Sep. 18, 2003.

(Continued)

*Primary Examiner* — Fred E Finch, III
(74) *Attorney, Agent, or Firm* — Michael J. Balconi-Lamica

(57) ABSTRACT

A fully digital synthesizable digital controller (152, 152a) controls a switch-mode DC-DC converter (150, 230, 240, 250, 260) having switching elements (154) and an LC circuit (156, 157) for producing an output voltage (160) that is maintained at a desired level regardless of load changes that can occur on the output. The digital controller (152, 152a) comprises an input stage (164), proportional-integral-derivative (PID) compensator (170), and a digital sigma-delta modulator (172). The input stage (164) produces a difference signal between a reference voltage Vref and a feedback voltage Vfbk, and comprises (i) first and second delta-sigma-delta modulators (178, 180) and a subtractor (182), (ii) a delta-sigma-delta modulator (180) and a subtractor (182); or (iii) a comparator (218). The PID compensator (170) processes the difference signal to compensate for an undesired phase shift and to stabilize the feedback loop. The digital sigma-delta modulator (172) generates a switching element control signal for controlling at least one of the switching elements.

12 Claims, 14 Drawing Sheets

(56) References Cited

U.S. PATENT DOCUMENTS

| | | | |
|---|---|---|---|
| 2009/0243578 A1* | 10/2009 | Wahby et al. | 323/283 |
| 2009/0267582 A1* | 10/2009 | Prodic et al. | 323/283 |
| 2011/0006937 A1* | 1/2011 | Zoso | 341/143 |
| 2012/0153917 A1* | 6/2012 | Adell et al. | 323/283 |
| 2012/0194141 A1* | 8/2012 | Shi et al. | 320/137 |
| 2013/0335049 A1* | 12/2013 | Schubert | 323/283 |
| 2014/0266121 A1* | 9/2014 | Wee et al. | 323/283 |

OTHER PUBLICATIONS

Dancy A.P. et al.: "High-Efficiency Multiple-Output DC-DC Conversion for Low-Voltage Systems" IEEE Trans. on VLSI Systems, vol. 8, No. 3, Jun. 2000; pp. 252-263.

Dancy A.P. et al.: "Ultra Low Power Control Circuits for PWM Converters" IEEE Power Electronics Specialists Conference, vol. 1, pp. 21-26; 1997, 0-7803-3840-5/97.

* cited by examiner

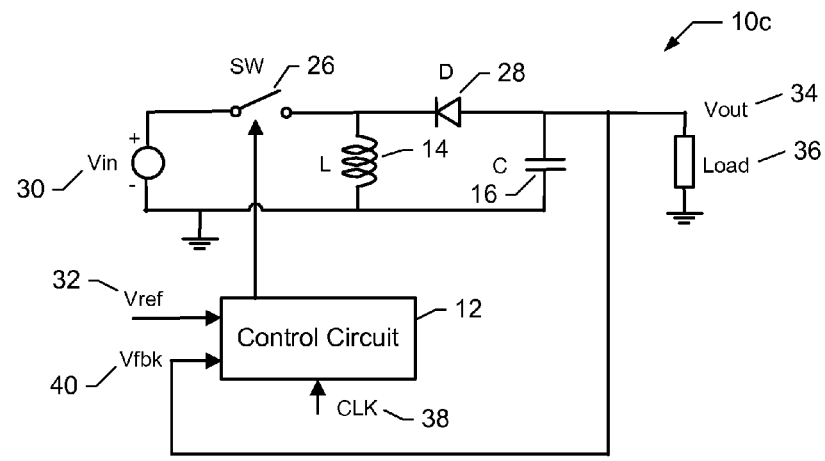
FIG. 3     PRIOR ART
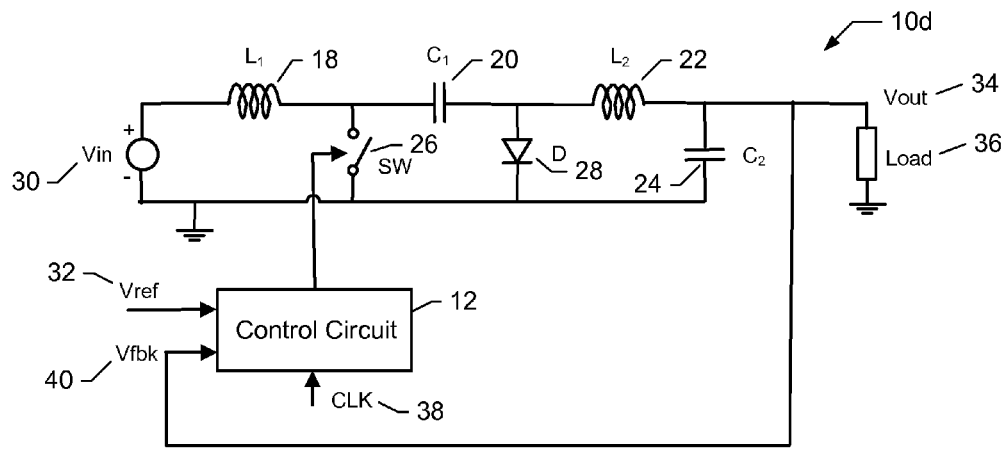
FIG. 4     PRIOR ART

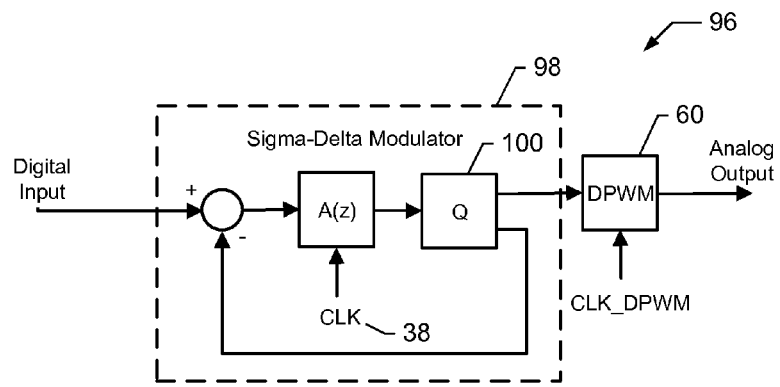
PRIOR ART
FIG. 11
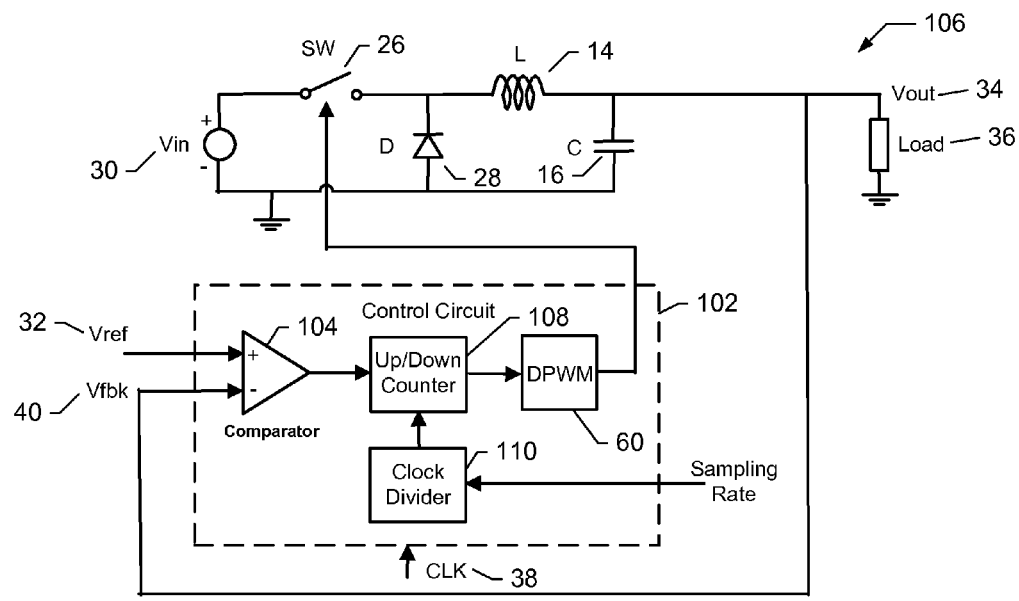
FIG. 12    PRIOR ART

DIGITAL CONTROLLER FOR SWITCH-MODE DC-DC CONVERTERS AND METHOD

CROSS-REFERENCE TO RELATED APPLICATION

This application claims the benefit of U.S. Provisional Application Ser. No. 61/796,041, filed Nov. 1, 2012, which is incorporated herein in whole by reference.

BACKGROUND

The present embodiments relate generally to switch-mode DC-DC converters, and more particularly, to nearly fully-digital synthesizable digital controllers for buck, boost, buck-boost and cuk switch-mode DC-DC converters, a method for switch mode control DC-DC conversion, and corresponding DC-DC converters.

Switch-mode DC-DC converters can step down, step up or invert, step down, and step up an input supply voltage, for generating one or more supply voltages as may be required in various electronic systems. A basic structure for a buck (step down), boost (step up), buck-boost (step up/down and invert) and cuk (step up/down and invert) converter is shown in FIGS. 1, 2, 3 and 4, respectively. The basic structure 10a,10b, 10c,10d comprises a controller 12 (Control Circuit), passive components 14,18,22,16,20,24 (L,$L_1$,$L_2$,C,$C_1$,$C_2$), and two switching elements 26,28. The switching elements may comprise, for example, a power transistor 26 (SW) and a diode 28 (D), or two power transistors (not shown). Each DC-DC converter also utilizes an input supply voltage 30 ($V_{out}$) and a reference voltage 32 ($V_{ref}$). The controller of the DC-DC converter compares the reference voltage 30 ($V_{ref}$) with the DC-DC converter output voltage 34 ($V_{out}$), processes the difference signal with a compensator (not shown), and generates pulse width modulation (PWM) control signals that are provided to the power transistor switching elements (SW) to keep the DC-DC converter output voltage 34 ($V_{out}$) at the desired value, in spite of potential load changes at the load 36 (Load). Furthermore, the switching frequency of the power transistor switching elements 26 (SW) is determined by the rate of the control circuit clock 38 (CLK). Monitoring a difference between the reference voltage 32 ($V_{ref}$) and the feedback signal 40 ($V_{fbk}$), the controller can maintain a desired output voltage 34 ($V_{out}$) by controlling a duty cycle of the signal driving the power transistor switching element 26 (SW). However, in traditional DC-DC converters, the controllers are implemented with Integrated Circuits (ICs) requiring complex analog circuitry, for which their design, implementation and fabrication are difficult, time-consuming, and costly.

Integration of analog circuitry presents several issues that are not present when integrating digital circuits. Analog circuitry typically requires longer design cycles. Analog circuitry also suffers from a lack of accurate models which can be used to detect failure and reduced performance problems, thus often necessitating costly chip re-spins. In addition, the physical layout of analog circuitry can strongly influence a corresponding performance of the analog circuit, both positively and negatively. Also, manufacturing process changes can adversely influence and/or necessitate redesign of an analog circuit. Still further, analog circuit performance is susceptible to temperature changes and aging, as well as, being susceptible to analog component precision. Furthermore, analog circuits are not suitable for applications which require very low supply voltages. Yet still further, radiation hardening of analog circuits, when required for particular applications, is difficult, lengthy and expensive. Moreover, testability of analog circuits is complicated, i.e., compared to a testability of digital circuits.

A common analog controller 12 for switch-mode DC-DC converters consists of an analog operational amplifier 42 with an analog compensation circuit 44 followed by an analog PWM circuit 46. The operational amplifier 42 computes a difference between a reference signal 32 and a feedback signal 40 and also implements the compensation circuit 44. The functional structure of a classic buck converter 10 with analog controller is shown in FIG. 5. The buck converter 10 of FIG. 5 uses a classic proportional-integral-derivative (PID) compensator which consists of an integrator and differentiator with proportional gain (i.e., OpAmp, $R_1$, $C_1$, and $C_2$). The PID compensator circuit compensates for the phase shift introduced by an LC circuit of the DC-DC converter 10, thus providing loop stability. The tracking loop characteristic can be modified by changing the parameters of the PID compensator (OpAmp,$R_1$,$C_1$,$C_2$). The PWM circuit 46 samples the output of the amplifier 42 at the rate of the clock (CLK) and converts it into pulses whose duration is proportional to the amplitude of the input samples. In the converter 10 of FIG. 5, the analog PWM circuit 46 is implemented with a saw-tooth oscillator 48 and a comparator 50; however, a triangle-wave oscillator could have been used instead. The comparator 50 of the PWM circuit 46 compares the saw-tooth signal with the input and produces a square-wave signal with the same frequency as the saw-tooth signal, but with a duty cycle depending on the result of the comparison, for example, as shown in FIG. 6. In this example, when the PWM input signal is higher than the saw-tooth signal, the comparator 50 output goes high, otherwise it goes low. However, the polarity of control signals depends on switch characteristics and for some switches it may be necessary to invert the comparator output. The performance of the switch-mode DC-DC converter 10 of FIG. 5 depends noticeably on the analog controller 10 characteristics. For instance, component precision, as well as changes due to temperature variations and aging, of the analog compensator circuit 44 can negatively affect the tracking characteristics of the corresponding switch-mode DC-DC converter 10.

While some controllers use digital compensators, the controllers still employ analog blocks such as analog-to-digital converters (ADCs) to digitize the difference signal and PWM circuits using delay lines to generate control signal pulses for the switch-mode DC-DC converter. As will be described further herein, a digital implementation of such PWM circuits would require an impractically high clock frequency. With reference now to FIG. 7, a buck converter 50 uses a controller 52 that includes a differential ADC 54, a digital PID compensator 56 followed by a low-pass filter 58 (LPF), and a digital pulse width modulation 60 (DPWM) circuit. In the buck converter 50 of FIG. 7, the difference between the reference voltage 32 and the feedback voltage 40 is digitized by the differential ADC 54, processed by a digital PID compensator 56, low-pass filtered 58, and converted into pulses by the DPWM circuit 60. Typically, the differential ADC 54 has eight (8) bits of resolution and could be implemented via two ADCs. As will be described later herein, the transfer function of a PID circuit 56 has a single pole at DC and two zeros. The criterion for placement of the zeros is mainly to reduce the phase shift introduced by the LC filter to achieve stability when the loop is closed and at the same time to optimize the tracking performance of the loop. Generally the zeros are not used to reduce the PID gain which tends to be very large at high frequencies. Rather, the reduction of large PID gain at high frequencies is performed by a low-pass filter 58 (LPF) placed after the PID compensator 56. To further reduce the gain, in some architectures the ADC 54 and PID compensator 56 are sampled at rates much higher than the switching frequency. In such a case, the low-pass filter 58 (LPF) would also decimate the signal produced by the PID compensator 56 to the switching frequency. When the reference 32 ($V_{ref}$) is digital, as shown in FIG. 8, a single ADC 62 is used to digitize the feedback signal 40.

In an attempt to reduce the analog complexity, some controllers have used sigma-delta ADCs instead of the traditional analog ADCs in the structures of FIGS. 7 and 8. However, this does not solve the problem addressed by the present embodiments, because sophisticated analog circuits are still needed to implement these sigma-delta ADCs.

One example of a typical implementation of a digital PWM (DPWM) circuit 65 is shown in FIG. 9. The DPWM circuit 65 is a digital equivalent of the PWM circuit 46 described earlier for the analog controller 12 of FIG. 5. Digital signals of the DPWM circuit 65 have a similar behavior to analog signals of the PWM circuit as depicted in FIG. 6. Besides the switching clock CLK 38 used to sample the ADC 54,62 and compensator 56, the DPWM circuit 65 also requires a faster clock CLK_DPWM 62 whose frequency is two to the power of N times the frequency of CLK (i.e., $2^N \times frequency_{CLK}$), where N is the number of bits of the input signal. The faster clock CLK_DPWM 62 is derived from the clock CLK 38 via a phase-lock loop 64 (PLL). The faster clock 62 is used to divide the switching period into two to the power of N increments (i.e., $2^N$ increments). The counter 66 (Mod-N Counter) produces a saw-tooth signal with a number of steps equivalent to two to the power of N (i.e., $2^N$ steps). An edge detector 68 (Rising Edge Detector) clears the counter 66 via the counter Clear input, which also sets the flip-flop 70 analog output (Q) to 1, whenever a new input sample (Digital Input) 72 is available. The flip-flop 70 output (Q) is set to 0, when the current output of the counter 66 is greater than the input value 72 (Digital Input). The digital input 72 is coupled to the non-inverting input of a comparator 74, and the output of the counter 66 is coupled to the inverting input of the comparator 74. The output of the comparator 74 is coupled to the input D of flip-flop 70. If the digital input value is 0 (i.e., Digital Input=0), then the pulse at the Analog Output (Q) of the flip-flop 70 lasts one cycle of CLK_DPWM 62; whereas, if the digital input value 72 is 1 (i.e., Digital Input=1), the pulse at the Analog Output (Q) of the flip-flop 70 lasts two cycles; if the digital input value 72 is 2 (i.e., Digital Input=2), then the pulse at the Analog Output (Q) of the flip-flop 70 lasts three cycles; and so on, up to the maximum input value 72 (i.e., Digital Input=(2 to the power of N) minus 1 (or $2^N-1$)) which produces a pulse lasting 2 to the power of N cycles of CLK_DPWM (or $2^N$ cycles of CLK_DPWM), equivalent to a full cycle of CLK 38. Even though the DPWM circuit 65 of FIG. 9 is totally digital, its main drawback is that it requires a very fast clock, thus increasing design difficulties and power consumption. For instance, for a relatively small input resolution of 8 bits and a switching clock frequency of 2 MHz, the DPWM circuit 65 of FIG. 9 would already require a frequency of 512 MHz for CLK_DPWM 62. Considering that higher resolutions are usually required to reduce noise and limit cycles, the DPWM architecture of FIG. 9 is impractical in many cases.

Another way to create pulse width modulated pulses from an N-bit input value, without the need for a faster clock than the switching clock, is to use a tapped-delay line. A typical circuit for a tapped delay line 76 is shown in FIG. 10. The tapped-delay line 76 consists of two to the power of N delay elements 78 (i.e., $2^N$ delay elements) connected to the inputs of a multiplexer 80 (e.g., $2^N$ to 1 multiplexer). The total delay of the tapped delay line 76 is one cycle of the switching clock CLK 38. The delay elements 78 can be implemented with digital gates. When a new digital input 82 sample is available, the multiplexer 80 selects the tap ($84_{1,2,3,\ldots,n}$, where n=$2^N$) corresponding to the value of the new digital input sample (e.g. tap $84_1$ is selected for Digital Input=0, tap $84_2$ is selected for Digital Input=1 ... tap $84_n$ is selected for Digital Input=n−1). In addition, a short pulse generated from a pulse generator 86, in response to the clock 38, sets the latch 88 (Latch) to 1 and also propagates through the tapped-delay line 76. When the clock pulse reaches the selected tap ($84_{1,2,3,\ldots,n}$) based upon the digital input 82, the latch 88 is reset to 0, via the latch reset input 90 (Reset). In this way for each digital input 82, an analog output pulse is generated with a duration equivalent to its value. The tapped delay line 76 further includes a delay matching network 92 coupled between the output of the pulse generator 86 and a set (Set) input 94 of latch 88. Compared to the circuit of FIG. 9, the circuit of FIG. 10 has the advantage of requiring only the clock 38 CLK, but it has the major drawback of requiring delay elements 78 which must be custom designed to introduce the specified delay. The precision requirement grows with the number of bits of the input signal 82. In addition, calibration techniques might be required to prevent temperature and supply voltage changes or process variations from affecting the delay.

Other architectures for DPWM circuits combine sigma-delta modulators with DPWM circuits, as will be described with reference to FIG. 11, to reduce the clock requirements of the DPWM of FIG. 9. As shown in FIG. 11, the circuit architecture 96 includes a traditional sigma-delta modulator 98 with a multi-bit quantizer 100 (Q) followed by a DPWM circuit. At a parity of clock (CLK) 38, sigma-delta modulators achieve higher resolutions than PWM circuits. With typical switching clocks, a sigma-delta modulator can achieve higher resolutions than 9 bits with 2 or 3-bit quantizers. Since the number of bits of the DPWM input is now very small, the clock CLK_DPWM is no longer too high and the DPWM circuit 60 of FIG. 11 can be implemented with the architecture 65 of FIG. 9. In addition, the clock CLK_DPWM needs to be only 4 or 8 times faster than the clock CLK 38. However, to further reduce power consumption, some architectures use the DPWM structure of FIG. 10 based on a tapped-delay line in the DPWM circuit of FIG. 11, even though the design complexity increases due to the delay elements of the tapped-delay line.

Still other DPWM circuits add extra circuitry to generate two control signals to drive the two switching elements of a synchronized rectifier. In the later instance, such a circuit typically requires a higher clock than the switching clock to generate non-overlapping control signals.

In addition, attempts to reduce the analog complexity of a controller 52 for switch-mode DC-DC converters 50, such as shown in FIG. 7, by replacing the ADC 54 with a comparator, have been mostly unsuccessful due to higher noise and limited load range compared to controllers using traditional analog converters. For example, a controller 102 using a comparator 104 is shown in FIG. 12. The architecture 106 is similar to the one of FIG. 7. In the circuit 106 of FIG. 12, the comparator 104 basically behaves as a 1-bit differential ADC which generates only the sign of the difference between the reference voltage 32 and the feedback signal 40. The comparator 104 has the advantage of a much simpler design and lower power consumption compared to a traditional ADC. It can also operate at lower power supply voltages. To further simplify the design, a simple integral compensator implemented with an up/down counter 108 can be used instead of a PID compensator. Loop gain can be controlled by changing the update rate of the up/down counter 108, via clock divider 110, or by scaling the output of the up/down counter. However, since the integral compensator implemented with the up/down counter 108 does not have zeroes, it cannot compensate properly for the large phase shift introduced by the LC filter when the load (Load) 36 is small. In fact, the phase shift increases as the load 36 is reduced. Stability can be achieved only by dramatically reducing the gain, but this is disadvantageously achieved at the expense of the response time. As the load 36 is reduced, the circuit 102 produces higher and higher ripple at the resonant frequency of the LC circuit, which disadvantageously limits the use of the converter 106 of FIG. 12 to a small range of loads. The performance of the converter 106 of FIG. 12 is also negatively affected by steady state limit cycles whose amplitude can be close to that of the ripple at the resonant frequency. This problem can be reduced by using a dead-zone comparator. With a dead-zone comparator, the up/down counter 108 is incremented or decremented only when the difference between the reference voltage 32 and the feedback signal 40 is outside the dead-zone of the comparator, otherwise the counter is not updated. However, the design of a dead-zone comparator is more complicated than the one of a traditional comparator. Also, the optimization of the dead-zone thresholds to reduce the limit cycle amplitude can be difficult. Digital differential input cells or low-voltage differential signal (LVDS) input cells, which are easily available in most of the digital libraries for integrated circuits, could be used as a comparator, but they do not contain a dead zone. With respect to the DPWM circuit 60, the same considerations made for FIG. 7 are valid for the controller 106 of FIG. 12 as well. DPWM circuits shown in FIGS. 9, 10 and 11 can be used.

Even though the controllers for switch-mode DC-DC converters (50,51) of FIGS. 7 and 8 require less analog circuitry than traditional analog controllers similar to the one of FIG. 5, they still need sophisticated analog circuits such as ADCs and DPWM circuits typically based on tapped-delay lines. In addition, the circuit 102 of FIG. 12 is simpler than the controller 50 of FIG. 7; however, a disadvantage is that the simplification has been obtained at the expense of performance. Furthermore, another disadvantage of the circuit 102 of FIG. 12 is that the circuit still requires a dead-zone comparator 104 instead of a classic comparator and a DPWM 60 based on tapped-delay lines or similar techniques.

Therefore, it would be highly desirable to have a digital controller for switch-mode DC-DC converters and method that is predominantly digital and configured for advantageously reducing problems encountered in the integration of traditional controllers. In other words, an improved digital controller and method for overcoming the problems in the art is desired.

SUMMARY

According to an embodiment of the present disclosure, a controller for switch-mode DC-DC converters comprises two delta-sigma-delta modulators, a proportional-integral-derivative (PID) compensator, and a digital sigma-delta modulator. The controller can be configured to control buck (step down), boost (step up), buck-boost (step up/down and invert) and cuk (step up/down and invert) switch-mode DC-DC converters. In one embodiment, the first delta-sigma-delta modulator is configured to (i) receive an analog reference voltage and (ii) produce a digital representation of the analog reference voltage. The second delta-sigma-delta modulator is configured to (i) receive an analog feedback signal and (ii) produce a digital representation of a feedback signal. A subtractor coupled to the outputs of the first and second delta-sigma-delta modulators produces a difference signal between (i) the digital representation of the reference voltage and (ii) the digital representation of the feedback signal. The subtractor output is coupled to an input of the PID compensator, wherein the PID compensator processes the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, and generates an output. Responsive to the PID compensator output, the digital sigma-delta modulator generates a control signal for a switching element of the controller for switch-mode DC-DC converters.

In another embodiment, a controller for switch-mode DC-DC converters includes a delta-sigma-delta modulator, a proportional-integral-derivative (PID) compensator, and a digital sigma-delta modulator. The delta-sigma-delta modulator is configured (i) to receive an analog feedback signal and (ii) to produce a digital representation of the analog feedback signal. A subtractor, responsive to a digital reference and to the output of the delta-sigma-delta modulator, produces a difference signal between (i) the digital reference and (ii) the digital representation of the feedback signal. The subtractor output is coupled to an input of the PID compensator, wherein the PID compensator processes the difference signal to stabilize the feedback loop by compensating for an undesired phase shift introduced in the DC-DC converter output voltage by the LC circuit, and generates an output. Responsive to the PID compensator output, the digital sigma-delta modulator generates a control signal for a switching element of the controller for switch-mode DC-DC converters.

In yet another embodiment, a controller for switch-mode DC-DC converters includes a comparator, a PID compensator, and a digital sigma-delta modulator. The comparator includes a positive input, a negative input, and an output. The comparator is configured to receive an analog reference voltage on its positive input and an analog feedback signal on its negative input, thus producing a 1-bit representation of a difference signal. The comparator output is coupled to the PID compensator, wherein the PID compensator processes the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, and generates an output. Responsive to the PID compensator output, the digital sigma-delta modulator generates a control signal for a switching element of the controller for switch-mode DC-DC converters.

In a further embodiment, a controller for switch-mode DC-DC converters includes two delta-sigma-delta modulators, a PID compensator, a digital sigma-delta modulator and a pulse generator. The first delta-sigma-delta modulator is configured (i) to receive an analog reference voltage and (ii) to produce a digital representation of the reference voltage. The second delta-sigma-delta modulator is configured (i) to receive an analog feedback signal and (ii) to produce a digital representation of the analog feedback signal. A subtractor, coupled to the outputs of the two delta-sigma-delta modulators, produces a difference signal between (i) the digital representation of the reference voltage and (ii) the digital representation of the feedback signal. The subtractor output is coupled to an input of the PID compensator, wherein the PID compensator processes the difference signal to stabilize the feedback loop by compensating for an undesired phase shift introduced in the DC-DC converter output voltage by the LC circuit, and generates an output. The PID compensator output is coupled to an input of the digital sigma-delta modulator, wherein the digital sigma-delta modulator generates an output. The digital sigma-delta modulator output is coupled to an input of the pulse generator. Responsive to the digital sigma-delta modulator output, the pulse generator generates two control signals for two switching elements of a synchronized rectifier of the controller for switch-mode DC-DC converters.

In a still further embodiment, a controller for switch-mode DC-DC converter includes a comparator, a PID compensator, a digital sigma-delta modulator, and a pulse generator. The comparator is configured to receive (i) an analog reference voltage on its positive input and (ii) an analog feedback signal on its negative input, thus producing a 1-bit representation of a difference signal. The comparator output is coupled to an input of the PID compensator, wherein the PID compensator processes the difference signal to stabilize the feedback loop by compensating for an undesired phase shift introduced in the DC-DC converter output voltage by the LC circuit, and generates an output. The PID compensator output is coupled to an input of the digital sigma-delta modulator, wherein the digital sigma-delta modulator generates an output. The output of the digital sigma-delta modulator is coupled to an input of the pulse generator. Responsive to the sigma-delta modulator output, the pulse generator generates two control signals for two switching elements of a synchronized rectifier of the controller for switch-mode DC-DC converters.

According to yet another embodiment, a controller for switch-mode DC-DC converters utilizes two fully digital synthesizable ADCs based on a delta-sigma-delta modulator, a PID compensator, and a sigma-delta modulator. Such a controller can be easily integrated in digital CMOS technology without requiring any special processing steps. In another embodiment, the controller for switch-mode DC-DC converters utilizes a comparator in place of the two fully digital synthesizable ADCs, as discussed further herein.

Advantages and benefits of the embodiments of the present disclosure, as well as additional inventive features, will become apparent to those of ordinary skill in the art upon reading and understanding the following detailed description when taken in conjunction with the accompanying drawings. In the paragraphs below the terms "LC filter" and "LC circuit" are used interchangeably.

BRIEF DESCRIPTION OF THE DRAWINGS

The embodiments of the present disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law. Moreover, it is noted that like reference numerals represent similar parts throughout the several views of the drawings.

FIG. 3 is a block diagram view of a prior art buck-boost (step up/down and invert) converter;

FIG. 4 is a block diagram view of a prior art cuk (step up/down and invert) converter;

FIG. 11 is a block diagram view of a prior art traditional sigma-delta modulator coupled to a digital pulse width modulation (DPWM) circuit;

FIG. 12 is a block diagram view of a prior art buck converter with a controller that uses comparator to generate a digital difference signal of analog reference and feedback signals;

DETAILED DESCRIPTION

Figure 1:
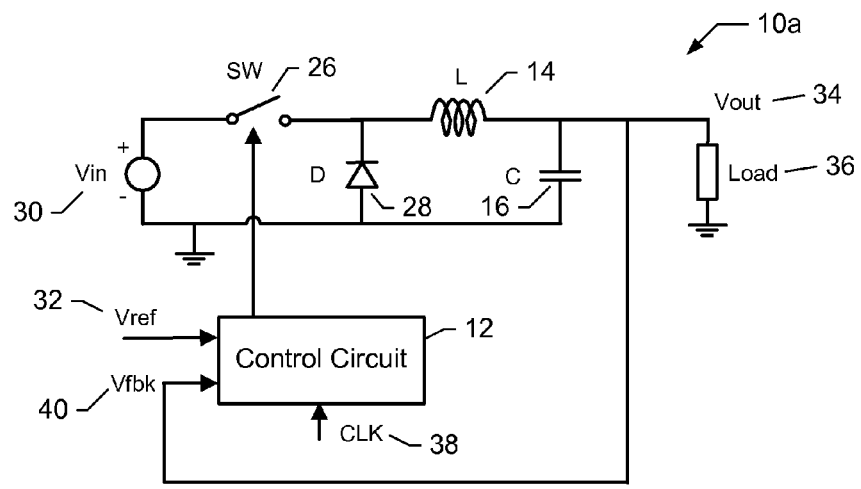
FIG. 1 is a block diagram view of a prior art buck (step down) converter.
Figure 2:
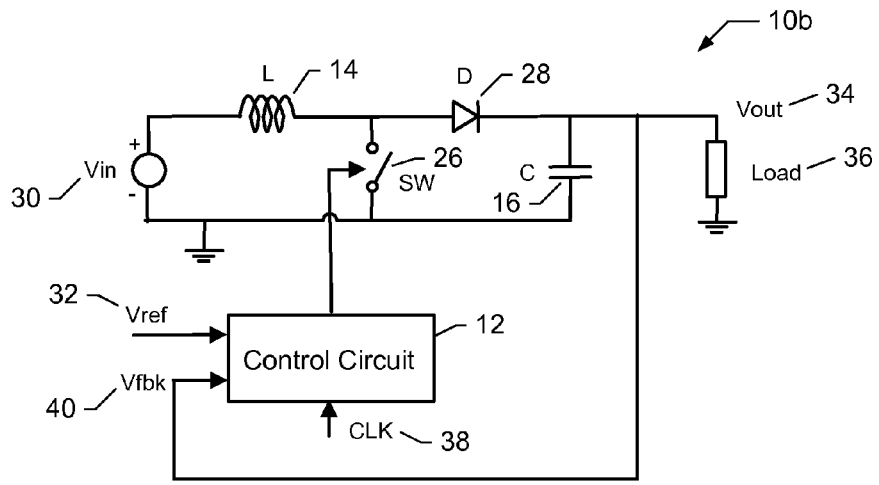
FIG. 2 is a block diagram view of a prior art boost (step up) converter.
Figure 5:
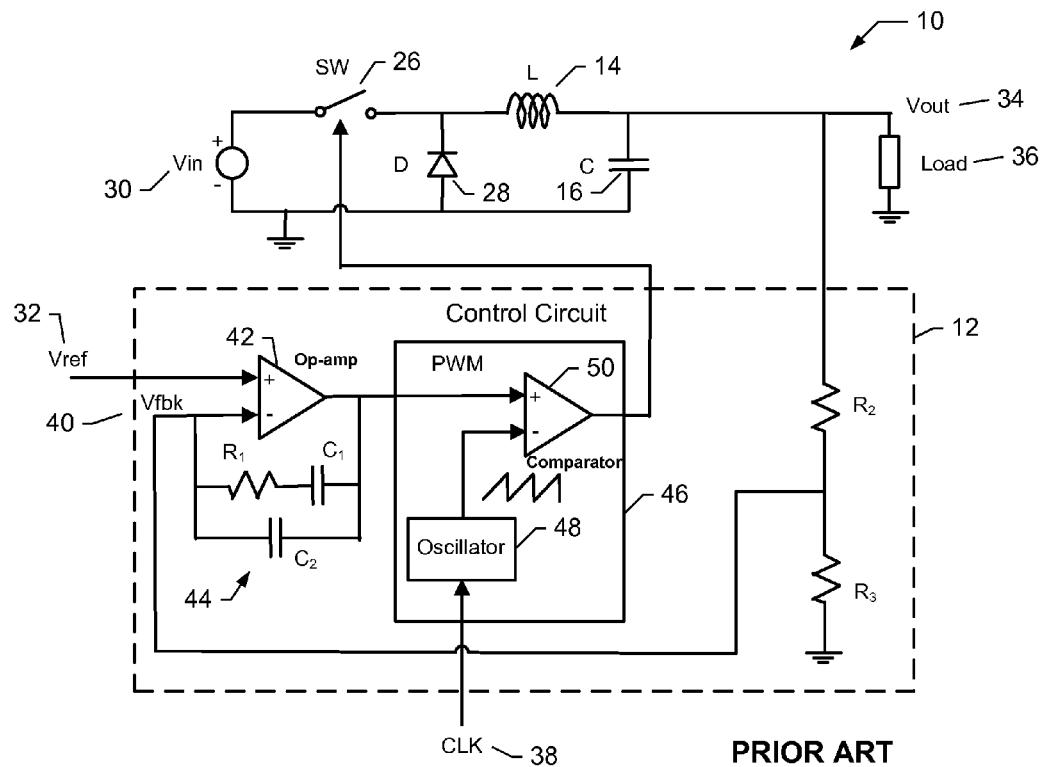
FIG. 5 is a block diagram view of a prior art buck converter that includes an analog controller with a classic proportional-integral-derivative (PID) compensator and pulse width modulation (PWM) circuit.
Figure 6:
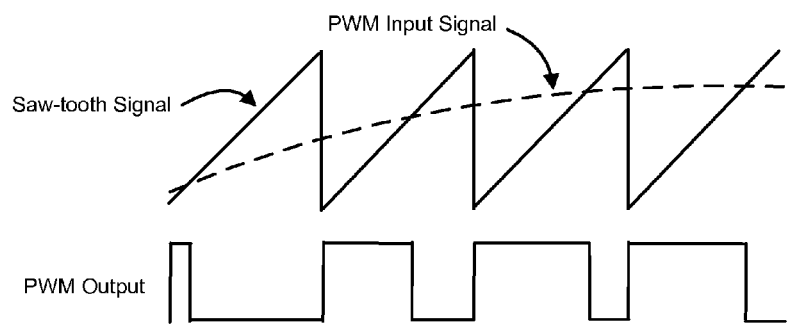
FIG. 6 is a graphic illustration view of input and output signals of the analog pulse width modulation (PWM) circuit of the analog controller in FIG. 5.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

As discussed briefly above, there are various drawbacks to using complex analog circuitry to implement controllers for switch-mode DC-DC converters. Thus, there exists a need for improved controllers for switch-mode DC-DC converters. A controller utilizing mostly digital circuitry offers a number of advantages, as discussed herein. The embodiments of the present disclosure provide a controller based on a delta-sigma-delta modulator (in contrast to using a traditional analog circuit ADC), a proportional-integral-derivative (PID) compensator, and a digital sigma-delta modulator (in contrast to using a PWM circuit), and thus utilizing mostly digital circuitry. In addition, further complexity reduction is achieved in other embodiments with the use of a comparator (instead of the delta-sigma-delta modulator), as discussed further herein.

According to the embodiments of the present disclosure, a fully digital synthesizable controller for switch-mode DC-DC converters can be used with buck (step down), boost (step up), buck-boost (step up/down and invert) and cuk (step up/down and invert) converters. In one embodiment, the digital controller includes an input stage configured to produce a difference signal between a reference voltage ($V_{ref}$) comprising an analog or digital reference voltage and a feedback voltage ($V_{fbk}$) in a feedback loop of the DC-DC converter representative of the output voltage, wherein the input stage comprises one selected from the group consisting of (i) first and second delta-sigma-delta modulators and a subtractor, (ii) a delta-sigma-delta modulator and a subtractor, and (iii) a comparator. For example, with respect to the input stage that includes the first and second delta-sigma-delta modulators, the two delta-sigma-delta modulators are configured to implement analog-to-digital converters (ADCs). The digital controller further comprises a proportional-integral-derivative (PID) compensator and a digital sigma-delta modulator. The two delta-sigma-delta modulators convert an analog reference voltage and an analog feedback signal to the digital domain. The difference between these two signals is processed by the PID compensator into a multi-bit output. The digital sigma-delta modulator converts the multi-bit PID compensator output into a 1-bit control signal for controlling a switching element of the corresponding switch-mode DC-DC converter. Yet another embodiment provides two control signals to drive two switching elements of a synchronized rectifier of a corresponding switch-mode DC-DC converter. Accordingly, the embodiments of the present disclosure advantageously provide analog functionality with all the benefits of a digital design process.

Figure 13:
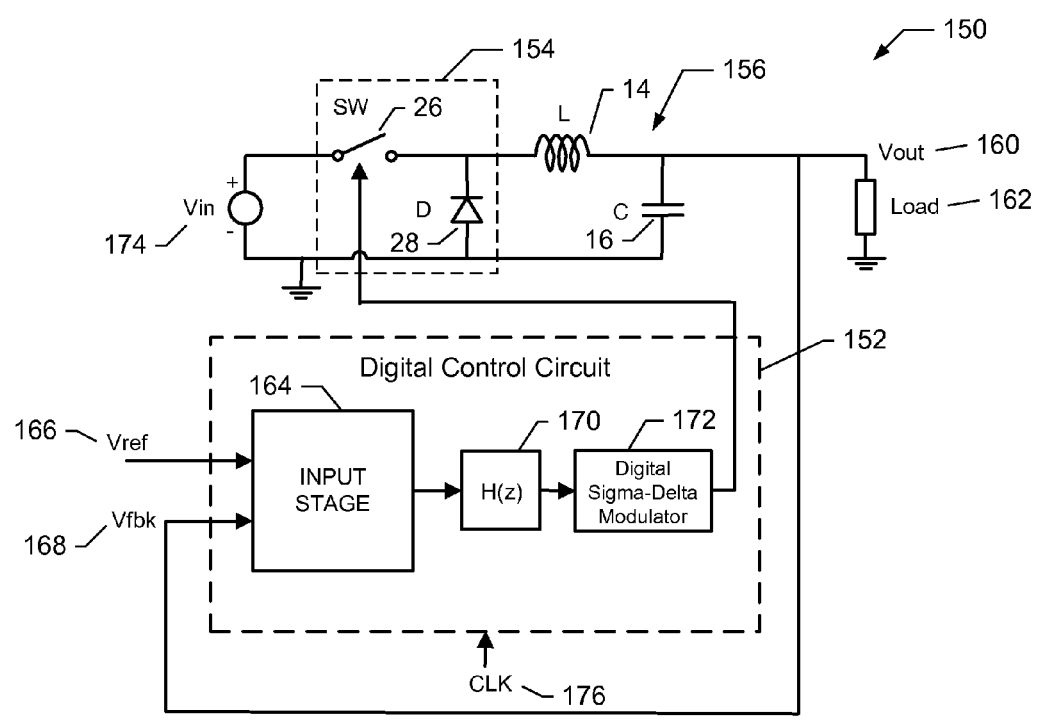
FIG. 13 is a block diagram view of a digital controller for a buck switch-mode DC-DC converter according to an exemplary embodiment of the present disclosure.

FIG. 13 is a block diagram view of a digital controller 152 for a buck switch-mode DC-DC converter 150 according to an exemplary embodiment of the present disclosure. The DC-DC converter 150 comprises at least two switching elements 154 and an LC circuit 156 for producing an output voltage 160 on an output of the DC-DC converter that is maintained at a desired level regardless of load changes on load 162 that can occur on the output. The digital controller 152 comprises an input stage 164 configured to produce a difference signal between a reference voltage ($V_{ref}$) 166 and a feedback voltage ($V_{fbk}$) 168 in a feedback loop of the DC-DC converter 150 representative of the output voltage 160. The input stage 164 comprises one selected from the group consisting of (i) first and second delta-sigma-delta modulators and a subtractor, (ii) a delta-sigma-delta modulator and a subtractor, and (iii) a comparator; and a proportional-integral-derivative (PID) compensator as discussed further herein. The input stage 164 is configured to process the difference signal to stabilize the feedback loop by compensating for an undesired phase shift introduced in the DC-DC converter output voltage 160 by the LC circuit 156 for large variations on the load 162 on the output of the DC-DC converter, the load variations ranging from no load to just more than zero ohms. The digital controller 152 further comprises a PID compensator 170 that includes an output for outputting a processed difference signal. A digital sigma-delta modulator 172, coupled to the PID compensator output, is configured to (i) generate at least one switching element control signal in response to the processed difference signal and (ii) output the at least one switching element control signal to a control input of at least one of the at least two switching elements 154 for controlling a respective switching element of the DC-DC converter 150. In FIG. 13, the DC-DC converter 150 includes passive components (L) 14 and (C) 16. The at least two switching elements 154 may comprise, for example, a power transistor 26 (SW) and a diode 28 (D), or two power transistors (not shown). The DC-DC converter 150 also utilizes an input supply voltage 174 ($V_{in}$) and reference voltage 166 ($V_{ref}$). The switching frequency of the power transistor switching elements 26 (SW) is determined by the rate of the control circuit clock 176 (CLK).

Figure 14:
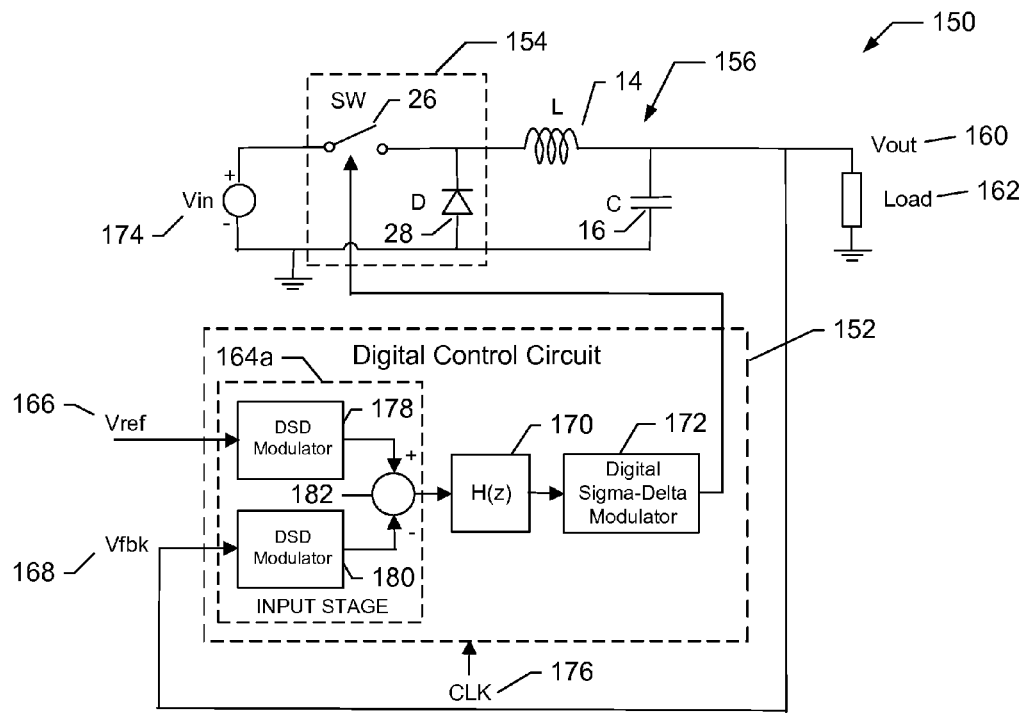
FIG. 14 is a block diagram view of a digital controller for a buck switch-mode DC-DC converter that comprises first and second delta-sigma-delta modulator implemented ADCs according to an exemplary embodiment of the present disclosure.

FIG. 14 illustrates a controller 152 for a buck converter 150 comprising an input stage 164a that includes two delta-sigma-delta modulators (178,180), a PID compensator 170 with transfer function H(z), and a digital sigma-delta modulator 172. All of the modules in FIG. 14 are clocked with a clock (CLK) 176 having a clock frequency $f_s$. The first delta-sigma-delta modulator 178 has an input for receiving a voltage reference ($V_{ref}$) 166, while the second delta-sigma-delta modulator 180 has an input for receiving the output 160 of the LC filter 156, in the form of feedback signal ($V_{fbk}$) 168. The positive and negative inputs of a subtractor 182 are coupled to the output of the first and second delta-sigma-delta modulators (178,180), respectively. The difference signal is processed by the PID compensator 170 which is configured to compensate for the phase shift introduced by the LC filter 156, thus stabilizing the feedback loop, as well as determining its tracking performance. In addition, the PID compensator 170 includes a transfer function H(z) having first and second real zeros configured to stabilize the feedback loop regardless of load variations in load 162 that can occur on the DC-DC converter output 160, the first real zero being located before a resonant frequency of the LC circuit 156 and the second real zero being located after the resonant frequency of the LC circuit 156, as will be discussed further herein below. In addition, the PID compensator 170 uses low-pass characteristics of an LC filter (i.e., the LC circuit) to reduce the gain of the PID compensator 170 at high frequencies. Furthermore, the digital sigma-delta modulator 172, coupled to the output of the PID compensator 170, is configured to generate the control signal for the switching element (SW) 26 of the at least two switching elements 154. The output voltage ($V_{out}$) 160 is kept at the desired value even though the load (Load) 162 changes.

Figure 15:
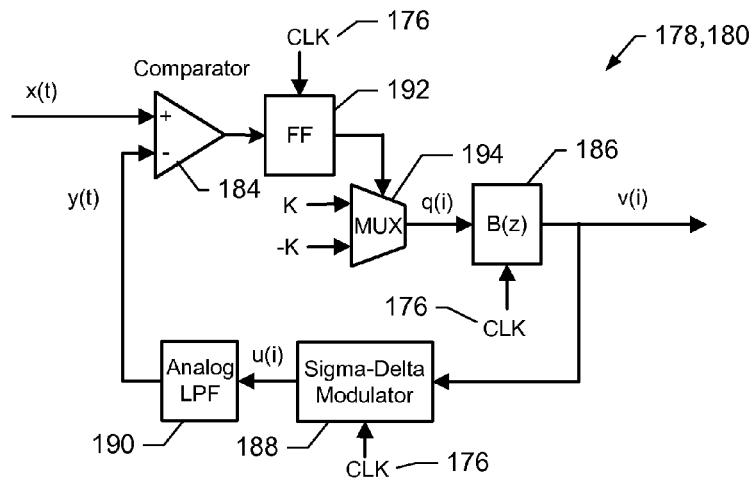
FIG. 15 is a block diagram view of further detail of a delta-sigma-delta modulator to digitize an analog reference and/or feedback signal of the digital controller of FIG. 14 according to an exemplary embodiment of the present disclosure.

One example of the basic structure of a delta-sigma-delta modulator (178,180) is shown in FIG. 15; however, other hardware implementations could be used to achieve the same functionality. The delta-sigma-delta modulator (178,180) comprises a comparator 184, a digital loop filter 186 having transfer function B(z), a digital sigma-delta modulator 188, and an analog smoothing filter 190. The output of the comparator 184 is input to flip-flop 192, which is clocked via clock CLK 176, and the output of the flip-flop 192 couples to an input of multiplexer (MUX) 194. A digital tracking loop converts an analog input signal x(t) into a digital representation v(i) on an output of the delta-sigma-delta modulator (178,180). The digital tracking loop also generates an analog input estimate y(t) of the analog input signal, which is compared with the analog input, and used to compute the quantized tracking error q(i). The tracking characteristics depend on the loop filter 186, the frequency of the clock CLK 176, and a quantizer step size K.

Figure 16:
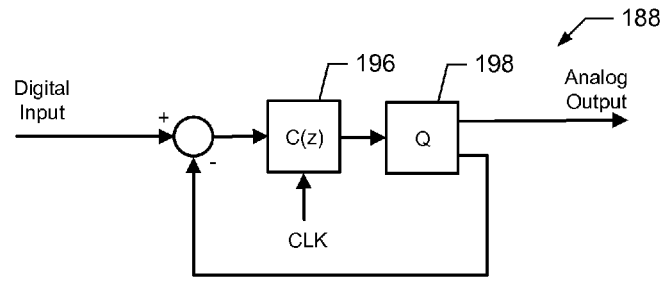
FIG. 16 is a block diagram view of further detail of the digital sigma-delta modulator shown in FIG. 15.
Figure 17:
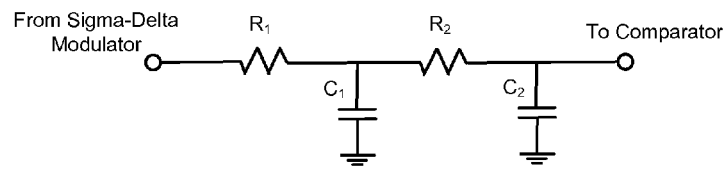
FIG. 17 is a schematic illustration view of a second order reconstruction filter implemented with resistor and capacitor (RC) components of the analog low pass filter (LPF) shown in FIG. 15.

Referring now to FIG. 16, an example of a sigma-delta modulator 188 used in the delta-sigma-delta modulator of FIG. 15 is shown; however, other structures could be used as well. The sigma-delta modulator 188 comprises a digital loop filter 196 having a transfer function C(z). The quantizer (Q) 198 can include a 1-bit or a 2-bit quantizer. A simple smoothing filter (LPF 190 in FIG. 15) is used to reject the out-of-band noise produced by the sigma-delta modulator 188. One example of a smoothing filter (LPF) 190, implemented with resistors and capacitors ($R_1$, $R_2$, $C_1$ and $C_2$), is shown in FIG. 17. The smoothing filter (LPF) 190 is also referred to herein as a reconstruction filter. With the exception of a few passive components for the smoothing filter 190, the design of a delta-sigma-delta modulator (178,180), according to the embodiments of the present disclosure, requires only digital library cells instead of complex analog blocks necessary for the implementation of traditional ADCs. In one embodiment, the comparator 184 in FIG. 15 can be implemented with a digital differential input cell or a low-voltage differential signal (LVDS) input cell, which is easily available in most of the digital libraries for integrated circuits. In addition, compared to traditional ADCs, the sigma-delta modulators (e.g., as indicated by reference numerals 172 and 188) of the embodiments of the present disclosure are completely digital. With regard to use of an output buffer, several techniques are known for reducing harmonic distortion introduced in a transition between the digital and analog domain. For this specific application, adequate performance can be achieved by using directly an output cell (not shown) from the digital library. If a 2-bit quantizer 198 is employed, two output buffers can be used, one for the least significant bit (LSB) bit and the other for the most significant bit (MSB) bit. The buffer outputs are summed together with two resistors, whereby the resistor for the LSB bit has twice the value of the other.

According to the embodiments of the present disclosure, the PID compensator 170 compensates for the phase shift introduced by the LC filter 156. The PID compensator 170 also determines the tracking performance of the closed loop. In one embodiment, the transfer function of the digital PID compensator 170 is given by:

$$H(z)=K_P+K_I/(1-z^{-1})+K_D(1-z^{-1}) \quad (1)$$

where $K_P$, $K_I$ and $K_D$ are the gains respectively of the proportional, integral and derivative blocks. The transfer function can be rewritten as follows:

$$H(z)=(a_0+a_1z^{-1}+z^{-2})/(1-z^{-1}) \quad (2)$$

where $a_0=K_P+K_I+K_D$ and $a_1=-K_P-2K_D$. As rewritten, the transfer function is that of a recursive filter with a single pole at DC and two zeros whose values depend on the gains. According to the embodiments of the present disclosure, the PID compensator 170 has two real zeroes, $z_{01}$ and $z_{02}$, and its transfer function is given by:

$$H(z)=G[(1-z_{01}z^{-1})(1-z_{02}z^{-1})]/(1-z^{-1}) \quad (3)$$

where G is the gain.

Figure 7:
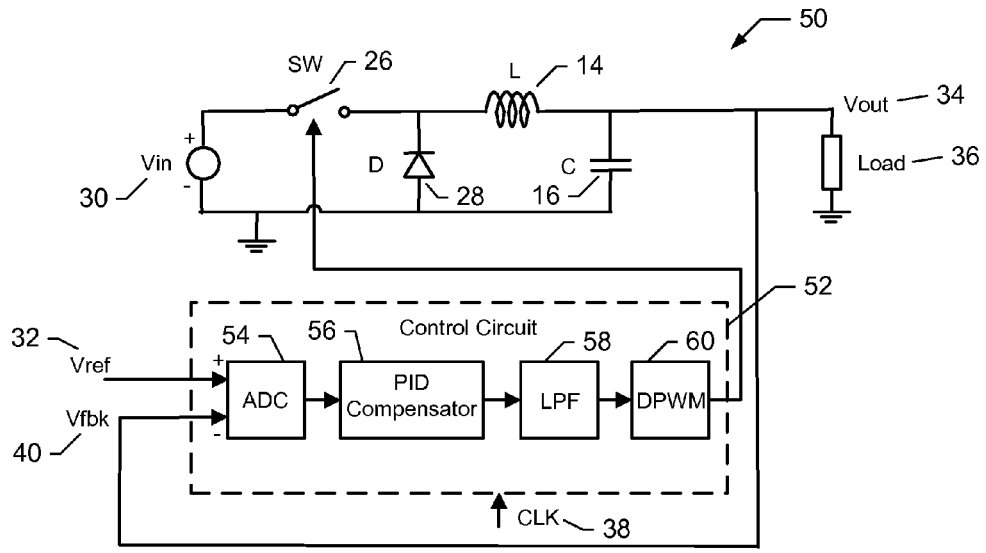
FIG. 7 is a block diagram view of a prior art buck converter with a controller that uses an analog reference input signal and includes an analog circuit implemented differential analog-to-digital converter (ADC) to sample the difference signal, and a digital PID compensator.
Figure 8:
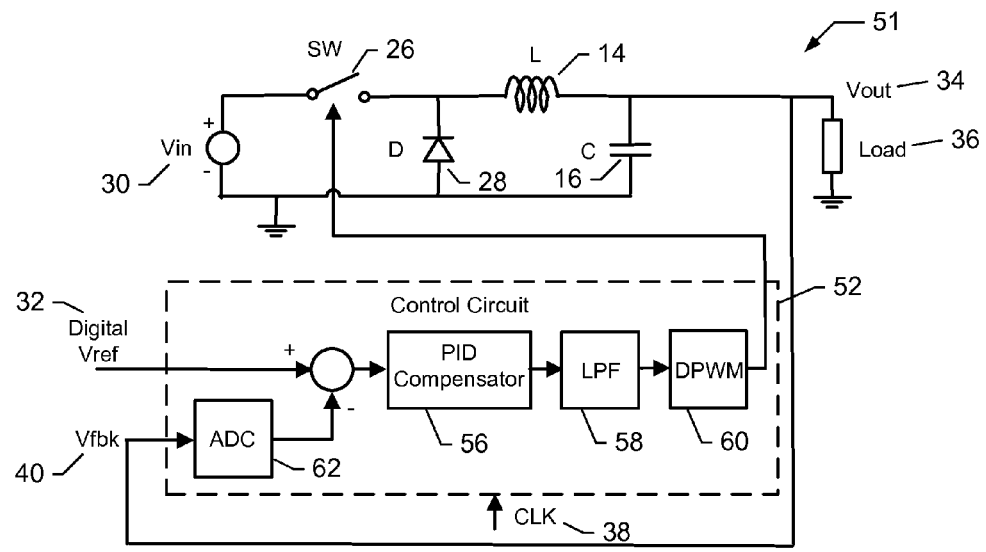
FIG. 8 is a block diagram view of a prior art buck converter with a controller that uses a digital reference input signal and includes an analog circuit implemented analog-to-digital converter (ADC) to sample an analog feedback signal, and a digital PID compensator.
Figure 18:
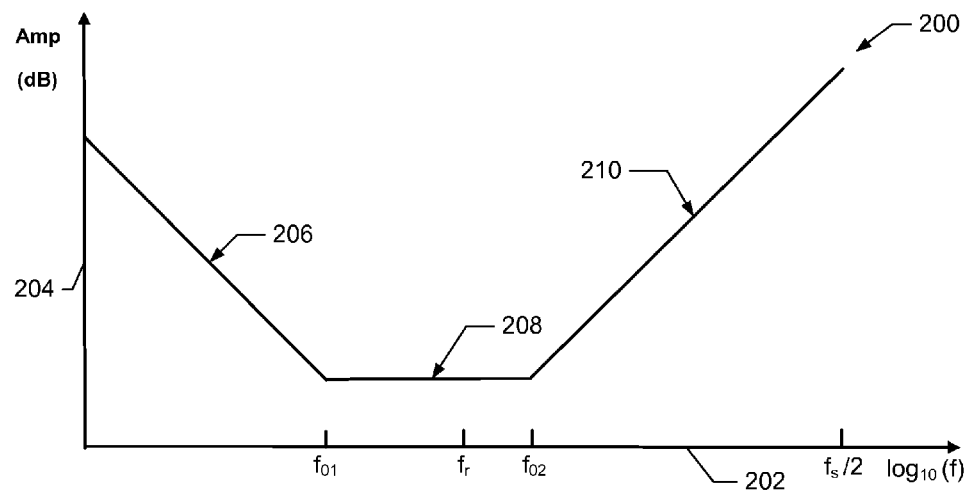
FIG. 18 is an illustration view of an amplitude response of a proportional-integral-derivative (PID) compensator of the digital controller according to an embodiment of the present disclosure.

An amplitude response of the transfer function H(z) according to equation (3) is shown on FIG. 18, where $f_{01}$ and $f_{02}$ are the frequencies of the first and second zeros, respectively. Since the frequency scale 202 is logarithmic, the frequency at the axis origin represents an arbitrary frequency greater than 0 and lower than the frequency ($f_{01}$) of the first zero. Due to the integrator of the PID compensator 170, the amplitude 204 (i) rolls off at −6 dB per octave from DC to the first zero (as indicated by reference numeral 206), (ii) is flat between the two zeroes (as indicated by reference numeral 208) and (iii) then rolls off at 6 dB per octave (as indicated by reference numeral 210). According to the embodiments of the present disclosure, the frequencies ($f_{01}$, $f_{02}$) of the zeroes are selected in such a way that the resonant frequency ($f_r$) of the LC filter 156 is between them. The resonant frequency is $f_r=1/(2\pi \cdot \sqrt{LC})$ for buck, boost and buck-boost converters and $f_1=1/(2\pi \cdot \sqrt{(L_1+L_2)C_1})$ for cuk converters. Advantageously, this configuration, in conjunction with the low-pass characteristic of the LC filter 156, reduces the high-frequency gain of the PID compensator 170, while at the same time the phase shift of the first and second zeros compensate for the phase shift of the LC circuit 156, thus stabilizing the loop. In fact, since the LC circuit 156 itself is a low-pass filter having an amplitude response which (i) has a peak at the frequency ($f_r$) or slightly before, depending on the load, and (ii) then decreases at higher frequencies, the overall amplitude response of the PID compensator and LC circuit decreases at frequencies higher than the resonant frequency. In FIG. 18, the notation $f_s/2$ is representative of one-half of the sampling frequency $f_s$. Compared to the circuit 52 of FIG. 7, the configuration 152 of FIG. 14 has the advantage that no additional specifically designed digital low-pass filter is needed after the PID compensator. Also, the sampling frequency ($f_s$) of the delta-sigma-delta modulators (ADCs) and PID compensator of the digital controller 152 of FIG. 14 are the same as the one for the switching frequency (i.e., the sampling frequency ($f_s$) equals the switching frequency ($f_{sw}$)). The elimination of the need (i) for a separate low-pass filter (e.g., LPF 58 in FIG. 7) and (ii) for a higher sampling frequency provided by the PID compensator 170 of FIG. 14 advantageously allows for a reduction in circuitry and power consumption. For instance, in one embodiment for buck, boost and buck-boost converters with a switching frequency ($f_{sw}$) of 2 MHz, C=10 μF, and L=10 μH, the resonant frequency ($f_r$) is 15.9 kHz and the frequencies of the first and second zeroes are respectively 2.9 and 34.2 kHz, designated ($f_{01}$) and ($f_{02}$), respectively, in FIG. 18.

Figure 9:
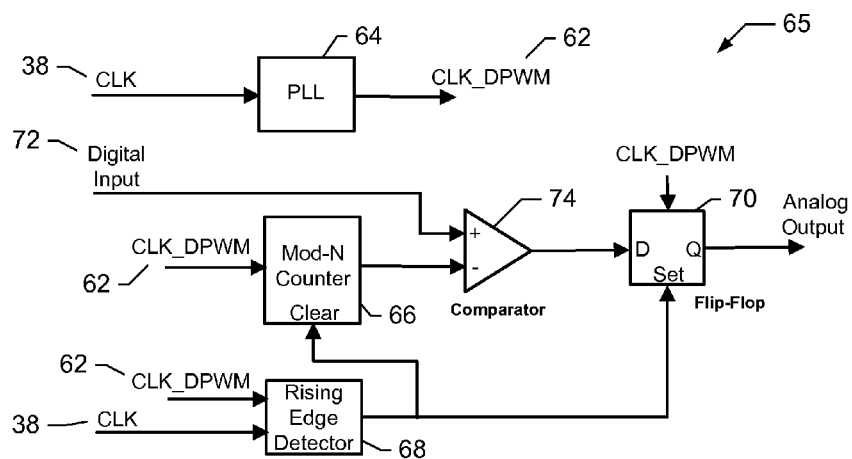
FIG. 9 is a block diagram view of a prior art digital pulse width modulation (DPWM) circuit that uses a counter and a comparator to determine a duration of pulses.
Figure 10:
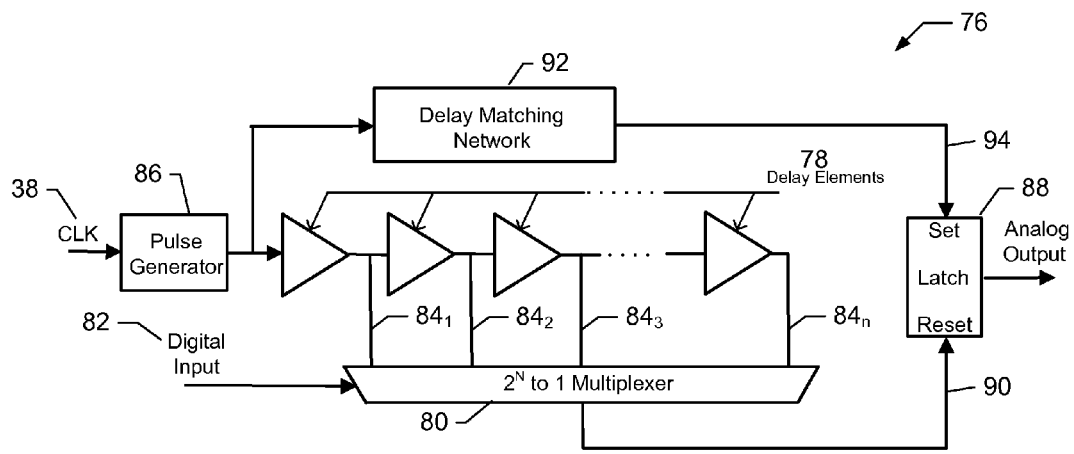
FIG. 10 is a block diagram view of a prior art digital pulse width modulation (DPWM) circuit that uses a tapped-delay line to determine a duration of pulses.
Figure 19:
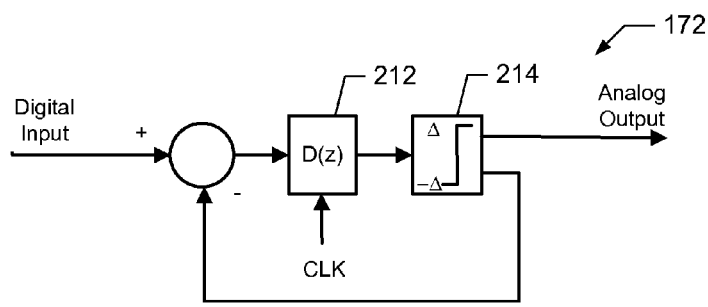
FIG. 19 is a block diagram view of a digital sigma-delta modulator, having a 1-bit quantizer, of the digital controller according to an embodiment of the present disclosure.

The output of the PID compensator 170 of FIG. 14 is converted into a control signal for the switching element (SW) 26, by a digital sigma-delta modulator 172, for example, as illustrated in FIG. 19. The digital sigma-delta modulator 172 illustrated in FIG. 19 comprises a digital loop filter 212 having a transfer function D(z) and a 1-bit quantizer 214. Other sigma-delta modulator architectures could also be used. Digital sigma-delta modulators present the following advantages compared to traditional DPWM circuits (such as shown and previously discussed herein with respect to FIGS. 9 and 10) or a combination of sigma-delta modulators and DPWM circuits (such as shown and previously discussed herein with respect to FIG. 11): (i) digital sigma-delta modulators do not require a higher sampling frequency than the switching frequency; (ii) digital sigma-delta modulators sampled at the switching frequency have higher resolutions than DPWM circuits (ii)(a) sampled at much higher sampling frequencies (for instance, ten times higher) or (ii)(b) with long tapped-delay lines (for instance, 1024 delay elements); (iii) the sigma-delta noise-shaping can be specifically designed to reduce noise injection in frequency bands where the application is particularly sensitive; and (iv) digital sigma-delta modulators only need digital library cells. With regard to use of an output buffer, similar considerations made for the digital sigma-delta modulator of the delta-sigma-delta modulator (FIG. 15) apply to this modulator as well. In other words, a cell from the digital library can be directly used for the output buffer.

Figure 20:
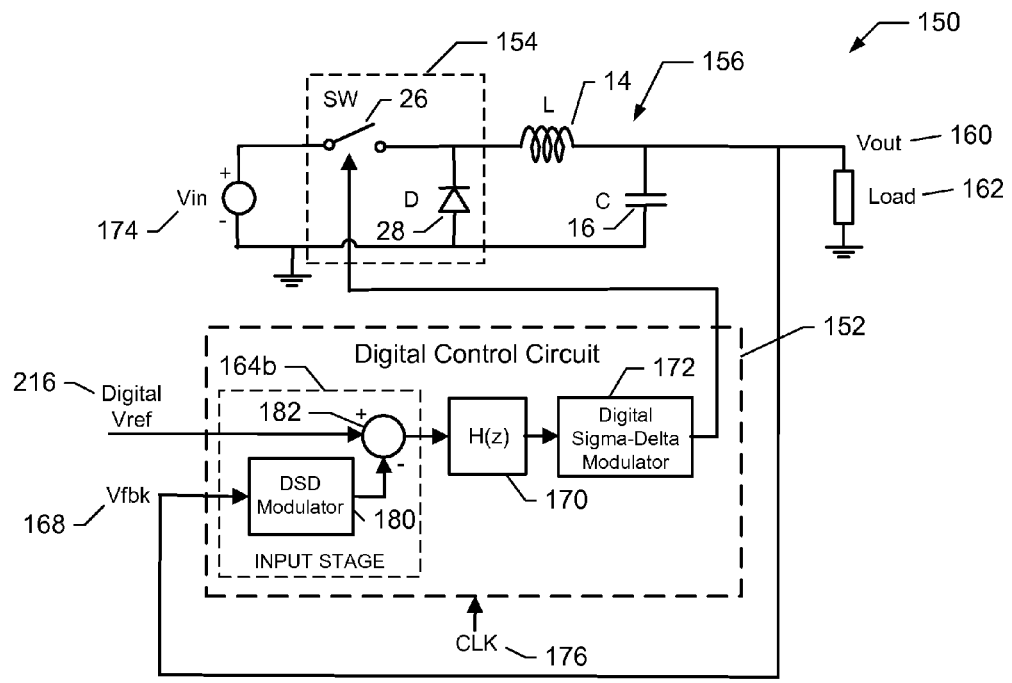
FIG. 20 is a block diagram view of a digital controller for a buck switch-mode DC-DC converter that comprises a single delta-sigma-delta modulator implemented ADC and uses a digital reference signal according to another embodiment.

When the input reference ($V_{ref}$) 216 is digital, only the output of the LC filter $V_{out}$ 160 (which corresponds to $V_{fbk}$ 168) needs to be converted to the digital domain. An embodiment of controller 152 with digital reference for a buck converter 150 is shown in FIG. 20. In the embodiment of FIG. 20, an input stage 164b includes a delta-sigma-delta modulator 180 configured to implement an analog-to-digital converter. A subtractor 182, coupled to the digital input reference ($V_{ref}$) 216 and to the output of the delta-sigma-delta modulator 180, produces a difference signal which is processed by a PID compensator 170. The PID compensator 170 of FIG. 20 comprises a transfer function H(z), the same as that as discussed herein above with reference to FIG. 14 and FIG. 18. Responsive to the PID compensator output, a digital sigma-delta modulator 172 produces the control signal for the switching element (SW) 26 of the at least two switching elements 154. The digital sigma-delta modulator 172 used in the controller 152 of FIG. 20 is the same as that as discussed herein above with reference to FIG. 14. Furthermore, all the considerations made for the PID compensator and digital sigma-delta modulator of FIG. 14 equally apply to the digital controller of FIG. 20.

Since the embodiments of FIG. 14 and FIG. 20 (i) can be implemented with digital library cells and (ii) do not require analog blocks, they can be easily embedded in fully digital integrated circuits or chips.

Figure 21:
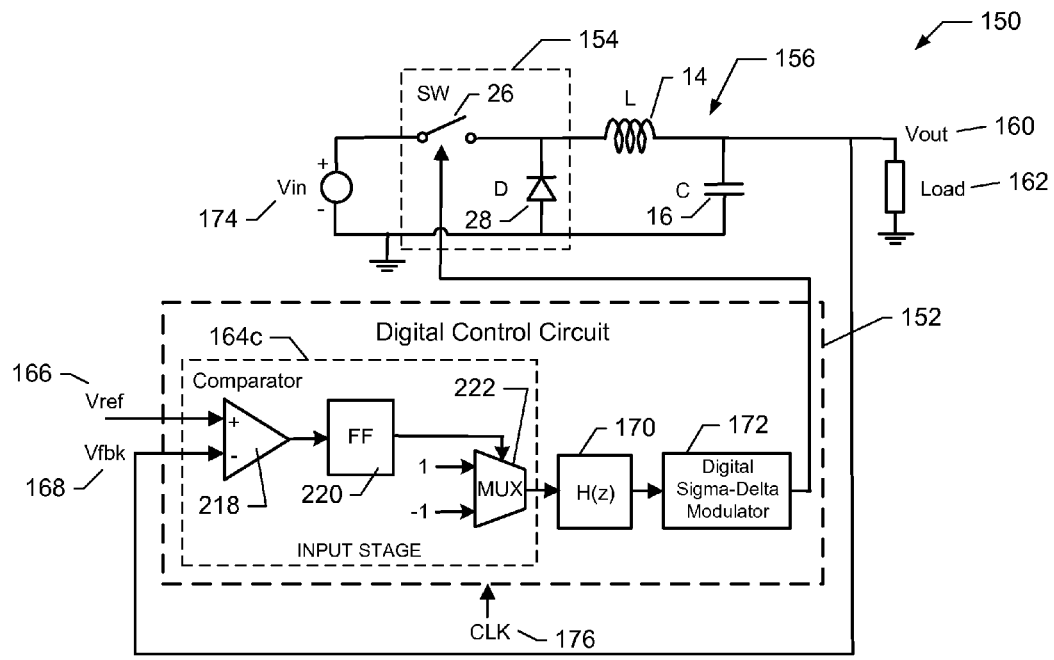
FIG. 21 is a block-diagram view of a digital controller for a buck switch-mode DC-DC converter that comprises a comparator and uses analog reference and feedback signals according to another embodiment of the present disclosure.

To further reduce the complexity, silicon area, and power consumption of the circuit of FIG. 14 and at the same time to eliminate the smoothing filters of the delta-sigma-delta modulators, in another embodiment of the present disclosure, a comparator is substituted for the delta-sigma-delta modulator ADCs (178,180). Referring now to FIG. 21, an embodiment of a controller 152 for a buck converter 150 with difference between the reference voltage ($V_{ref}$) 166 and output of the LC filter ($V_{fbk}$) 168 performed by an input stage 164c that includes a comparator 218 is shown. The comparator 218 output is sampled by a flip-flop 220 which drives a multiplexer 222. The multiplexer 222 turns an unsigned signal (0's and 1's) into a two's complement signal, wherein the multiplexer output represents the quantized difference signal which can assume the values 1 or −1 based on the result of the comparison. When the difference between $V_{ref}$ 166 and the output of the LC filter $V_{fbk}$ 168 is greater than 0, the multiplexer output is 1, otherwise the multiplexer output is −1. The inputs of the multiplexer 222 could be swapped; however, in that case the feedback sign would also need to be changed. The multiplexer output is processed by a PID compensator 170. A digital sigma-delta modulator 172 converts the PID compensator output into a control signal for the switching element SW 26 of the at least two switching elements. The PID compensator 170 in FIG. 21 is the same as the PID compensator with transfer function H(z) of FIG. 14 described by equation (3). In addition, the digital sigma-delta modulator 172 in FIG. 21 is the same as that used for the digital control circuit of FIG. 14. In addition, the PID compensator 170 is provided with two real zeros, the first real zero being located before the resonant frequency ($f_r$) of the LC filter 156 and the second real zero being located after the resonant frequency ($f_r$) of the LC filter 156, as shown and discussed with respect to the example amplitude response 200 of FIG. 18, which advantageously stabilizes the tracking loop even if the load 162 has very large variations. In other words, the PID compensator 170, having a transfer function H(z) that includes two real zeros with the resonant frequency of the LC filter 156 being located in between the real zeros, advantageously provides tracking loop stability to the DC-DC converter 150 in the presence of very large variations on the load 162 (e.g., loads ranging from (i) no load to (ii) a load of just more than zero ohms (i.e., almost zero ohms, which is equivalent to almost a short circuit)). As a result, the load range is advantageously much greater than a load range of control circuits with only an integral compensator used in prior art controllers, for example, as shown in FIG. 12. Furthermore, the control circuit 152 of FIG. 21 has smaller limit cycles (much smaller than the ripple at the resonance frequency of the LC circuit 156), even though a standard comparator, to be discussed below, is used. The control circuit 152 of FIG. 21 further does not need or require a dead-zone comparator. In one embodiment, the comparator 218 can be implemented with a digital differential input cell or a low-voltage differential signal (LVDS) input cell easily available in most digital libraries for integrated circuits. Also, the circuit 152 of FIG. 21 uses only a digital sigma-delta modulator 172 to generate the control signal for the switching element (SW) 26 and does not use a DPWM circuit (as shown and previously discussed herein with respect to FIGS. 9 and 10) or a sigma-delta modulator followed by a DPWM circuit (as shown and previously discussed herein with respect to FIG. 11) employed in prior art controllers. The digital sigma-delta modulator 172 of FIG. 21 has various advantages similar to those, as discussed and illustrated earlier herein, with respect to the embodiment of FIG. 14.

With reference still to FIG. 21, it is noted that the functionality of the flip-flop 220 and multiplexer 222 of the digital controller 152 shown in FIG. 21 can be implemented in different ways. For example, in yet another embodiment, the digital controller 152 is the same as shown in FIG. 21 with the exception that the comparator output of comparator 218 can be coupled directly (not shown) to the PID compensator 172. In this embodiment, the PID compensator 172 is modified with a suitable function block to perform conversion of the comparator output, similar to that of the flip-flop and multiplexer, and thereby process the comparator output directly. The remainder of the digital controller 152 would be the same with respect to FIG. 21. In still yet another embodiment, the digital controller 152 is similar to that of FIG. 21 with the exception that a digital reference input is used (instead of analog reference $V_{ref}$ 166). In the later case, the digital reference input can be converted to analog with use of a classic sigma-delta modulator followed by a reconstruction filter (i.e., LPF).

The embodiments of the present disclosure discussed herein above have been applied mainly to buck converters. However, the embodiments of the digital controller 152 described previously herein with reference to FIGS. 13-21 can also be used advantageously to control one or more of boost, buck-boost and cuk DC-DC converters.

Figure 22:
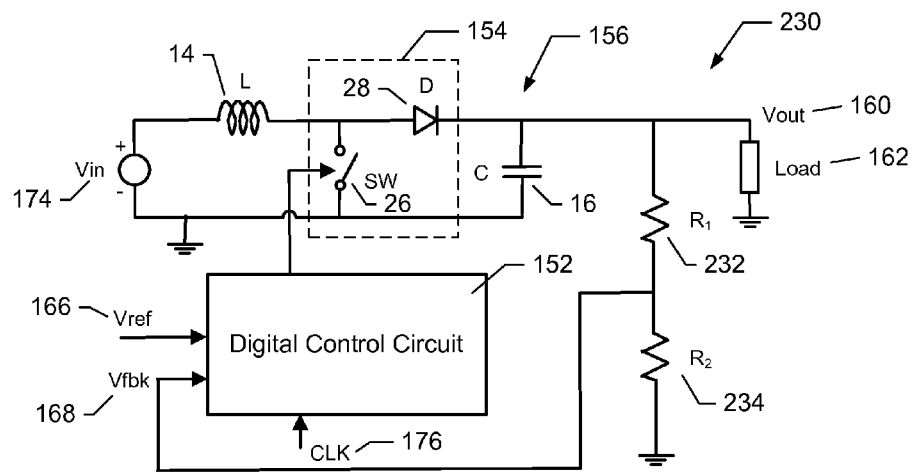
FIG. 22 is a block diagram view of a digital controller for a boost switch-mode DC-DC converter according to one embodiment of the present disclosure.

FIG. 22 shows another embodiment of the present disclosure that comprises a boost DC-DC converter 230 with digital controller or digital control circuit. In the digital controller 230 of FIG. 22, the digital controller 152 as shown and previously described with respect to the embodiments of FIG. 14, 20 or FIG. 21 can be used. With respect to the boost DC-DC converter 230, since the output voltage $V_{out}$ 160 is higher than the input supply voltage $V_{in}$ 174, a voltage divider $(R_1,R_2)$, indicated by reference numerals 232 and 234 coupled between $V_{out}$ 160 and common (or ground potential), is used to reduce the output voltage $V_{out}$ 160 to a suitable level so that it can be compared with the reference voltage $V_{ref}$ 166. In other words, with respect to the digital control circuit 152 of FIG. 22, the voltage reference $V_{ref}$ 166 is not compared directly to the output voltage $V_{out}$ 160; rather, the voltage reference $V_{ref}$ 166 is compared to the voltage divided output voltage, i.e., the voltage at the node of the voltage divider between resistors $R_1,R_2$. In addition, the feedback voltage $V_{fbk}$ 168 (which is compared to the reference $V_{ref}$ 166) and the output voltage $V_{out}$ 160 generated by the boost DC-DC converter 230, are given by:

$$V_{fbk}=V_{out}R_2/(R_1+R_2) \quad (4)$$

$$V_{out}=V_{ref}(R_1+R_2)/R_2 \quad (5)$$

Figure 23:
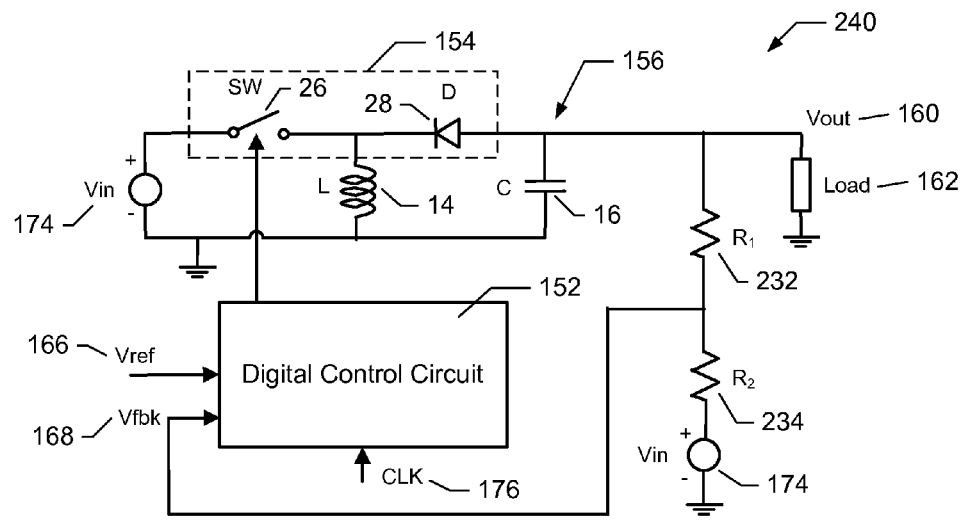
FIG. 23 is a block diagram view of a digital controller for a buck-boost switch-mode DC-DC converter according to one embodiment of the present disclosure.

Referring now to FIG. 23, a buck-boost DC-DC converter 240 with digital controller 152 according to another embodiment of the present disclosure is shown. The digital controller 152 of FIG. 23 makes use of the digital controller as shown and previously described with respect to the embodiments of FIG. 14, 20 or 21. With respect to the buck-boost DC-DC converter 240, since the buck-boost DC-DC converter inverts the output voltage $V_{out}$ 160 and can increase or decrease it, a voltage divider $(R_1,R_2)$ indicated by reference numerals 232 and 234, is coupled between the output voltage $V_{out}$ 160 and the input voltage $V_{in}$ 174, instead of ground potential. The voltage divider $(R_1,R_2)$ connected to the input voltage $V_{in}$ is used to invert and scale the output voltage $V_{out}$ 160 at the node of the voltage divider between resistors $R_1,R_2$ so that the scaled output voltage (i.e., $V_{fbk}$) 168 can be compared with the reference voltage $V_{ref}$ 166. The feedback voltage $V_{fbk}$ 168 and the output voltage $V_{out}$ 160 generated by the buck-boost DC-DC converter 240 are given by:

$$V_{fbk}=V_{out}R_2/(R_1+R_2)+V_{in}R_1/(R_1+R_2) \quad (6)$$

$$V_{out}=-V_{in}R_1/R_2+R_{ref}(R_1+R_2)/R_2 \quad (7)$$

As it can be seen from equation (6), even if $V_{out}$ is negative, the feedback voltage $V_{fbk}$ can be made positive by properly selecting the two resistor values $(R_1,R_2)$. It is important to note that in the case of buck and boost DC-DC converters an increase in the reference voltage $(V_{ref})$ corresponds to an increase of the output voltage $(V_{out})$. However, for the buck-boost DC-DC converter, an increase in the voltage reference $(V_{ref})$ corresponds to a decrease in the voltage output $(V_{out})$.

Figure 24:
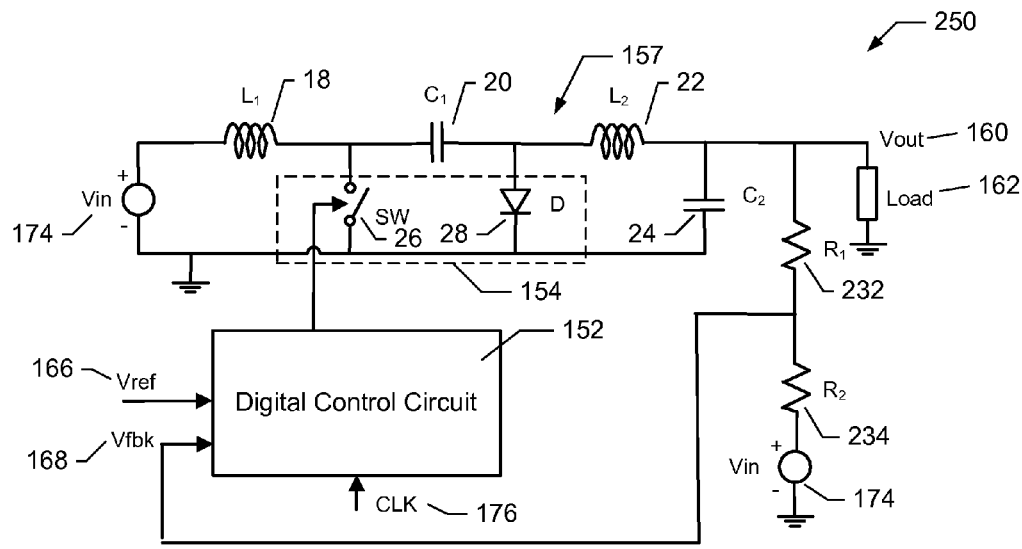
FIG. 24 is a block diagram view of a digital controller for a cuk switch-mode DC-DC converter according to one embodiment of the present disclosure.

FIG. 24 shows a cuk DC-DC converter 250 with digital controller 152 according to an embodiment of the present disclosure. The digital controller 152 of FIG. 24 makes use of the digital controller as shown and previously described with respect to the embodiments of FIG. 14, 20 or 21. With respect to the cuk DC-DC converter 250, since the cuk DC-DC converter inverts the output voltage $V_{out}$ 160 and can increase or decrease it like the buck-boost DC-DC converter, a similar voltage divider $(R_1,R_2)$, indicated by reference numerals 232 and 234, connected on one side to the input voltage $V_{in}$ 174 can be used for the cuk DC-DC converter as well. The cuk DC-DC converter 250 further includes an LC circuit 157 of passive components 18,22, 20,24 $(L_1,L_2,C_1,C_2)$ and at least two switching elements 26,28 (SW,D).

Figure 25:
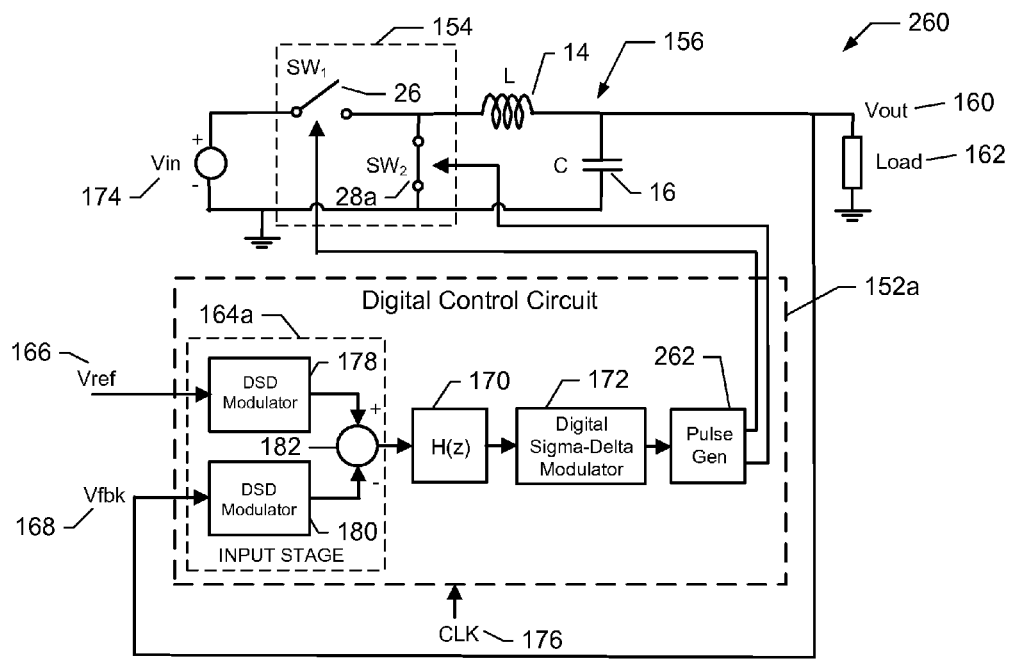
FIG. 25 is a block diagram view of a digital controller for a buck switch-mode DC-DC converter that comprises first and second delta-sigma-delta modulator implemented ADCs and two control signal outputs for a synchronized rectifier according to another exemplary embodiment of the present disclosure.

The switch-mode DC-DC converters, as discussed previously herein, so far use (i) a single switching element 26 controlled by the digital control circuit 152 and (ii) one diode 28. A main disadvantage of such circuits is that the ON-resistance of the diode is not negligible. That is, the ON-resistance of the diode causes loss of efficiency. Since switching elements such as (i) MOSFETs or (ii) MOSFETs combined with Schottky diodes have much smaller ON-resistance than diodes, the embodiments of the present disclosure further include synchronized rectifier DC-DC converters that eliminate this problem by replacing the diode 28 with at least a second switching element 28a driven by the digital controller 152a. Referring now to FIG. 25, a buck converter 260 with synchronized rectifier according to another embodiment of the present disclosure is shown. The digital controller 152a of FIG. 25 uses a similar controller as shown and previously described with respect to the embodiment of FIG. 14, except for the addition of a pulse generator 262 coupled to the output of the digital sigma-delta modulator 172. The control signals for the at least two switching elements 154 cannot be derived from the sigma-delta modulator output by directly connecting the first switching element 26 to the sigma-delta modulator output and the second 28a to an inverted version of the same signal, because during the rising and falling times of the control signals both switching elements would be ON. The switching elements are not ideal and therefore they require some time to switch from OFF to ON and vice versa. Accordingly, dead times are added to the control signals, as follows.

Figure 26:
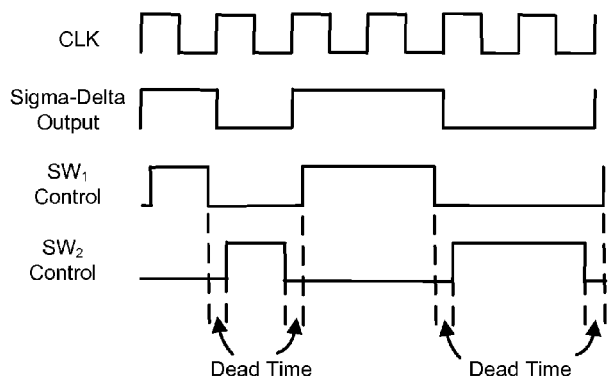
FIG. 26 is a graphical illustration view of a timing diagram of a clock, a digital sigma-delta modulator output, and two control signals for the synchronized rectifier of the buck switch-mode DC-DC converter of FIG. 25.
Figure 27:
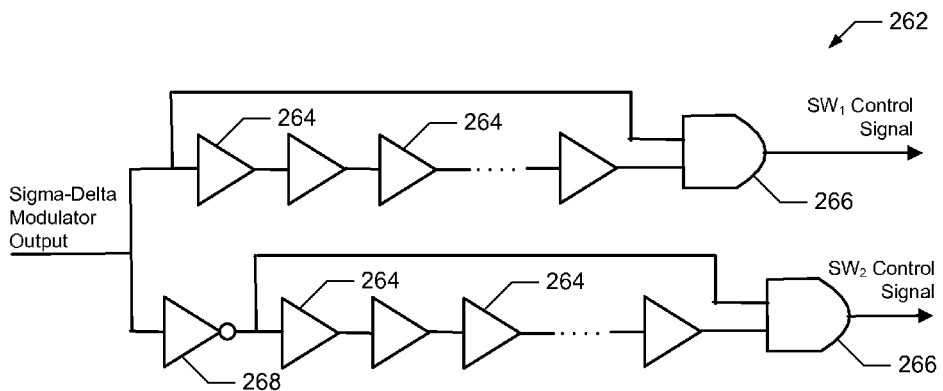
FIG. 27 is a schematic illustration view of a pulse generator circuit configured to generate two control signals for the synchronized rectifier of the buck switch-mode DC-DC converter of FIG. 25.

The timing diagram of FIG. 26 shows an example of control signals and their relationship with the sigma-delta modulator output and clock (CLK). Dead times advantageously prevent the switching elements $SW_1$ (26) and $SW_2$ (28a) from switching at the same time. FIG. 27 shows an example of a circuit 262 which generates the respective control signals with dead times for switching elements $SW_1$ and $SW_2$. The circuit 262 of FIG. 27 can be implemented with combinatorial logic, for example, using multiple delay elements 264, two AND gates 266 and an inverter 268. In addition, the circuit 262 for generating dead time control signals does not require any clocks having a frequency higher than the switching frequency. Other implementations could be used with the same functionality. The first control signal $SW_1$ is obtained by delaying the sigma-delta modulator output with some delay elements and logically ANDing the delayed output with the sigma-delta modulator output itself. The second control signal $SW_2$ is generated by using the same circuit on the inverted output of the sigma-delta modulator. The delay introduced by each delay element 264 and the number of delay elements determine the duration of the dead time. The delay of each element depends on the type of delay element 264 used as well as on the process and environmental variations (i.e., mainly temperature and supply voltage). If the controller 152a is implemented in an application specific integrated circuit (ASIC), then the number of delays can be computed once the type of delay element and fabrication process are selected. If a field programmable gate array (FPGA) is used, then the number of delay elements 264 depends on the delay elements available in the FPGA library. Since the duration of the dead time is not critical, environmental variations do not affect the performance of the respective controller.

Figure 28:
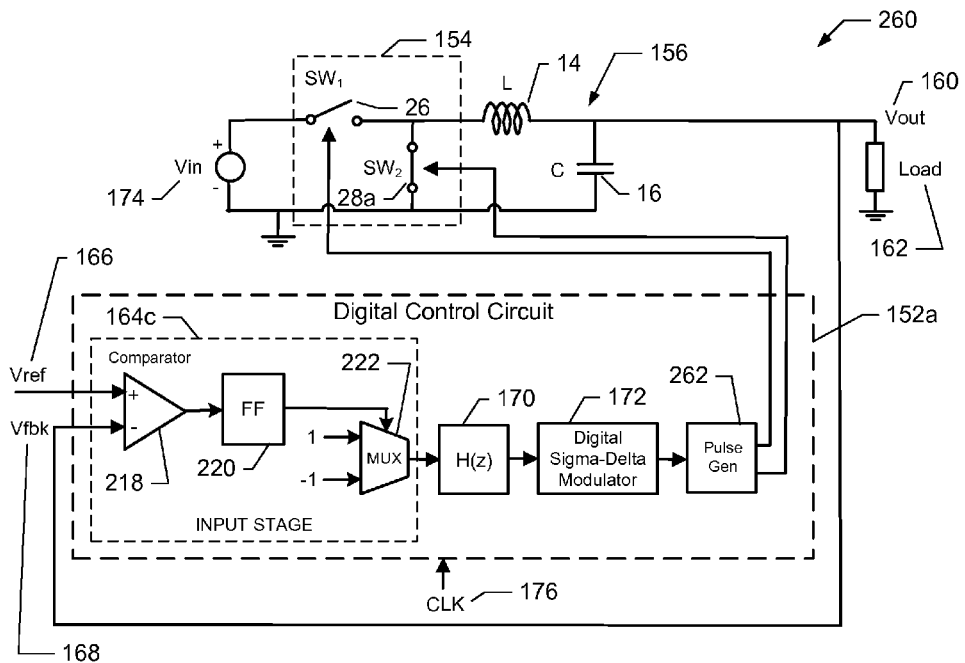
FIG. 28 is a block-diagram view of a digital controller for a buck switch-mode DC-DC converter that comprises a comparator and two control signal outputs for a synchronized rectifier according to another embodiment of the present disclosure.

Referring now to FIG. 28, a buck converter 260 with synchronized rectifier according to another embodiment of the present disclosure is shown. The digital controller 152a of FIG. 28 uses a modified version of the controller as shown and previously described with respect to FIG. 21 obtained by coupling a pulse generator 262 to the output of the digital sigma-delta modulator 172. A pulse generator 262, similar to that described for the circuit of FIG. 25 and shown in FIG. 27, is also used.

The embodiments of the present disclosure discussed herein above with reference to FIGS. 25 and 28 have been applied to a buck converter with synchronized rectifier. The embodiments of the digital controller described previously herein with reference to FIGS. 25 and 28can also be used advantageously to control one or more of boost, buck-boost and cuk DC-DC converters with synchronized rectifier.

Since most of the circuitry of the digital controller (152, 152a) for switch-mode DC-DC converter is digital, the digital controller according to the embodiments of the present disclosure has many advantages over traditional analog controllers. In particular, except for a few passive components in the case of embodiments of FIGS. 14, 20 and 25, all other components of the digital controller can be easily implemented in digital CMOS technology, and, more particularly, in CMOS gate-array and FPGA technology or radiation-hardened CMOS technology, without requiring any special processing steps beyond normal processing steps of a respective technology. Also, the digital controller according to the embodiments of the present disclosure can be used in very low power integrated circuits (ICs), and, as stated above, is suitable for radiation-hardened environments.

The use of the terms "a" and "an" and "the" and similar referents in the context of describing the embodiments herein (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the embodiments according to the present disclosure.

According to the present disclosure, there is provided a digital controller for a switch-mode DC-DC converter, the DC-DC converter having at least two switching elements and an LC circuit for producing an output voltage on an output of the DC-DC converter that is maintained at a desired level regardless of load changes that can occur on the output, the digital controller comprising: an input stage configured to produce a difference signal between a reference voltage ($V_{ref}$) and a feedback voltage ($V_{fbk}$) in a feedback loop of the DC-DC converter representative of the output voltage, wherein the input stage comprises one selected from the group consisting of (i) first and second delta-sigma-delta modulators and a subtractor, (ii) a delta-sigma-delta modulator and a subtractor, and (iii) a comparator; a proportional-integral-derivative (PID) compensator configured to process the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, the PID compensator having an output for outputting a processed difference signal; and a digital sigma-delta modulator coupled to the PID compensator output configured to (i) generate at least one switching element control signal in response to the processed difference signal and (ii) output the at least one switching element control signal to a control input of at least one of the at least two switching elements for controlling a respective switching element of the DC-DC converter. In a further embodiment, the PID compensator includes a transfer function having first and second real zeros configured to stabilize the feedback loop regardless of load variations that can occur on the DC-DC converter output, the first real zero being located before a resonant frequency of the LC circuit and the second real zero being located after the resonant frequency of the LC circuit.

In another embodiment, the at least two switching elements comprise first and second switching elements controllable via first and second control signals, respectively, the digital controller further comprising: a pulse generator coupled between the output of the digital sigma-delta modulator and a respective control input of the first and second switching elements, wherein responsive to the output of the digital sigma-delta modulator, the pulse generator is configured to generate the first and second control signals for controlling the first and second switching elements, respectively, of the DC-DC converter.

In a further embodiment, the digital controller is configured to control a switch-mode DC-DC converter that comprises one selected from the group consisting of a buck, boost, buck-boost, and cuk DC-DC converter.

In yet another embodiment, the reference voltage ($V_{ref}$) comprises an analog reference voltage signal and the feedback voltage ($V_{fbk}$) comprises an analog feedback voltage signal. The input stage further comprises first and second delta-sigma-delta modulators and a subtractor. The first delta-sigma-delta modulator has a modulator input configured to receive the analog reference voltage signal, and a modulator output configured to supply a digital signal, wherein the digital signal comprises a digital representation of the analog reference input signal. The second delta-sigma-delta modulator has a modulator input configured to receive the analog feedback voltage signal, and a modulator output configured to supply a digital signal, wherein the digital signal comprises a digital representation of an analog output signal of the LC circuit. The subtractor has a first input for receiving the digital representation of the analog reference input signal and a second input for receiving the digital representation of the analog output signal of the LC circuit, wherein the subtractor is configured to generate and output the difference signal on a subtractor output in response to the first and second inputs.

In another embodiment, the reference voltage ($V_{ref}$) comprises a digital reference voltage signal and the feedback voltage ($V_{fbk}$) comprises an analog feedback voltage signal. The input stage further comprises a delta-sigma-delta modulator and a subtractor. The delta-sigma-delta modulator has a modulator input configured to receive the analog feedback voltage signal, and a modulator output configured to supply a digital signal, wherein the digital signal comprises a digital representation of an analog output signal of the LC circuit. The subtractor has a first input for receiving the digital reference voltage signal and a second input for receiving the digital representation of the analog output signal of the LC circuit, wherein the subtractor is configured to generate and output the difference signal on a subtractor output in response to the first and second inputs.

In a further embodiment, the reference voltage ($V_{ref}$) comprises an analog reference voltage signal and the feedback voltage ($V_{fbk}$) comprises an analog feedback voltage signal. The input stage further comprises a comparator with first and second inputs, the first input configured to receive the analog reference voltage signal, the second input configured to receive the analog feedback voltage signal, the comparator further having an output for outputting a digital signal in response to a comparison of the first and second inputs, the digital signal corresponding to a 1-bit representation of the difference signal for processing by the PID compensator.

In a still further embodiment, the reference voltage ($V_{ref}$) comprises an analog reference voltage signal and the feedback voltage ($V_{fbk}$) comprises an analog feedback voltage signal. The input stage further comprises a comparator with first and second inputs, a flip-flop, and a multiplexer. The first input is configured to receive the analog reference voltage signal, and the second input is configured to receive the analog feedback voltage signal, the comparator further having an output for outputting a comparator output signal that is produced by the comparator in response to the first and second inputs. The flip-flop has an input for receiving the comparator output signal, the flip-flop further having an output for outputting a sampled signal that is generated by the flip-flop in response to the received comparator output signal. The multiplexer is configured to multiplex, in response to the sampled signal, quantization values on an output of the multiplexer, wherein multiplexing the quantization values converts the sampled signal which corresponds to an unsigned signal of 0's and 1's into a two's complement signal, wherein the two's complement signal comprises the difference signal for processing by the PID compensator.

There is further disclosed herein a method of digitally controlling a switch-mode DC-DC converter, the DC-DC converter having at least two switching elements and an LC circuit for producing an output voltage on an output of the DC-DC converter that is maintained at a desired level regardless of load changes that can occur on the output, the method comprising: producing, via an input stage, a difference signal between a reference voltage ($V_{ref}$) and a feedback voltage ($V_{fbk}$) in a feedback loop of the DC-DC converter representative of the output voltage, wherein producing the difference signal via the input stage comprises producing the difference signal via one selected from the group consisting of (i) first and second delta-sigma-delta modulators and a subtractor, (ii) a delta-sigma-delta modulator and a subtractor; and (iii) a comparator; processing, via a proportional-integral-derivative (PID) compensator, the difference signal to stabilize the feedback loop by compensating for an undesired phase shift introduced in the DC-DC converter output voltage by the LC circuit, wherein processing further comprises outputting, via an output of the PID compensator, a processed difference signal; and generating, via a digital sigma-delta modulator coupled to the PID compensator output, at least one switching element control signal in response to the processed difference signal, wherein generating further comprises outputting, via an output of the digital sigma-delta modulator, the at least one switching element control signal to at least one of the at least two switching elements for controlling a respective switching element of the DC-DC converter. In another embodiment, processing, via the PID compensator, comprises processing via a PID compensator that includes a transfer function having first and second real zeros configured to stabilize the feedback loop regardless of load variations that can occur on the DC-DC converter output, the first real zero being located before a resonant frequency of the LC circuit and the second real zero being located after the resonant frequency of the LC circuit.

In another embodiment, the at least two switching elements comprise first and second switching elements controllable via first and second control signals, respectively, the method further comprising: generating, via a pulse generator coupled between the output of the digital sigma-delta modulator and the first and second switching elements, the first and second control signals in response to the output of the digital sigma-delta modulator, the first and second control signals for controlling the first and second switching elements, respectively, of the DC-DC converter.

In yet another embodiment, the reference voltage ($V_{ref}$) comprises an analog reference voltage signal and wherein the feedback voltage ($V_{fbk}$) comprises an analog feedback voltage signal, further wherein the input stage comprises first and second delta-sigma-delta modulators and a subtractor, wherein producing the difference signal comprises receiving, via the first delta-sigma-delta modulator having a modulator input, the analog reference voltage signal, and supplying, via the first delta-sigma-delta modulator having a modulator output, a digital signal, wherein the digital signal comprises a digital representation of the analog reference input signal, receiving, via the second delta-sigma-delta modulator having a modulator input, the analog feedback voltage signal, and supplying, via the second delta-sigma-delta modulator having a modulator output, a digital signal, wherein the digital signal comprises a digital representation of an analog output signal of the LC circuit, and receiving, via the subtractor having a first input and a second input, the digital representation of the analog reference input signal and the digital representation of the analog output signal of the LC circuit, and generating the difference signal, via the subtractor, in response to the first and second inputs.

In a further embodiment, the reference voltage ($V_{ref}$) comprises a digital reference voltage signal and wherein the feedback voltage ($V_{fbk}$) comprises an analog feedback voltage signal, further wherein the input stage comprises a delta-sigma-delta modulators and a subtractor, wherein producing the difference signal comprises receiving, via the delta-sigma-delta modulator having a modulator input, the analog feedback voltage signal, and supplying, via the delta-sigma-delta modulator having a modulator output, a digital signal, wherein the digital signal comprises a digital representation of an analog output signal of the LC circuit, and receiving, via the subtractor having a first input and a second input, the digital reference voltage signal and the digital representation of the analog output signal of the LC circuit, and generating the difference signal, via the subtractor, in response to the first and second inputs.

In a still further embodiment, the reference voltage ($V_{ref}$) comprises an analog reference voltage signal and wherein the feedback voltage ($V_{fbk}$) comprises an analog feedback voltage signal, further wherein the input stage comprises a comparator with first and second inputs, wherein producing the difference signal comprises receiving, via the first and second inputs of the comparator, the analog reference voltage signal and the analog feedback voltage signal, and producing, via the comparator, a digital signal in response to the first and second inputs, the digital signal corresponding to a 1-bit representation of the difference signal for processing by the PID compensator.

In another embodiment, the reference voltage ($V_{ref}$) comprises an analog reference voltage signal and wherein the feedback voltage ($V_{fbk}$) comprises an analog feedback voltage signal, further wherein the input stage comprises a comparator with first and second inputs, a flip-flop, and a multiplexer, wherein producing the difference signal comprises receiving, via the first and second inputs of the comparator, the analog reference voltage signal and the analog feedback voltage signal, and producing, via the comparator, a comparator output signal in response to the first and second inputs, receiving, via an input of the flip-flop, the comparator output signal, and generating, via the flip-flop, a sampled signal in response to the received comparator output signal, and multiplexing, via the multiplexer, in response to the sampled signal, quantization values on an output of the multiplexer, wherein multiplexing the quantization values converts the sampled signal which corresponds to an unsigned signal of 0's and 1's into a two's complement signal, wherein the two's complement signal comprises the difference signal for processing by the PID compensator.

In another embodiment, a switch-mode DC-DC converter comprises: at least two switching elements, wherein at least one of the at least two switching elements is configured to switch in response to a switching element control signal; an LC circuit coupled to the at least two switching elements for producing an output voltage on an output of the DC-DC converter in response to switching of the at least two switching elements; and a digital controller, wherein the digital controller comprises: (a) an input stage for producing a difference signal between a reference voltage ($V_{ref}$) and a feedback voltage ($V_{fbk}$) in a feedback loop of the DC-DC converter representative of the output voltage, wherein the input stage comprises one selected from the group consisting of (i) first and second delta-sigma-delta modulators and a subtractor, (ii) a delta-sigma-delta modulator and a subtractor, and (iii) a comparator; (b) a proportional-integral-derivative (PID) compensator for processing the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, the PID compensator having an output for outputting a processed difference signal; and (c) a digital sigma-delta modulator coupled to the PID compensator output for (i) generating at least one switching element control signal in response to the processed difference signal and (ii) outputting the at least one switching element control signal to a control input of the at least one of the at least two switching elements for controlling a respective switching element of the DC-DC converter. The switch-mode DC-DC converter can further comprise one selected from the group consisting of a buck, boost, buck-boost, and cuk DC-DC converter. In a still further embodiment, the at least two switching elements comprise first and second switching elements controllable via first and second control signals, respectively, wherein the digital controller further comprises (d) a pulse generator coupled between the output of the digital sigma-delta modulator and a respective control input of the first and second switching elements, wherein responsive to the output of the digital sigma-delta modulator, the pulse generator is configured to generate the first and second control signals for controlling the first and second switching elements, respectively, of the DC-DC converter.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

What is claimed is:
1. A digital controller for a switch-mode DC-DC converter, the DC-DC converter having at least two switching elements and an LC circuit for producing an output voltage on an output of the DC-DC converter that is maintained at a desired level regardless of load changes that can occur on the output, the digital controller comprising:

an input stage configured to produce a difference signal between a reference voltage ($V_{ref}$) and a feedback voltage ($V_{fbk}$) in a feedback loop of the DC-DC converter representative of the output voltage, wherein the reference voltage ($V_{ref}$) comprises an analog reference voltage signal and wherein the feedback voltage ($V_{fbk}$) comprises an analog feedback voltage signal, wherein the input stage comprises a comparator with first and second inputs, a flip-flop, and a multiplexer;

a proportional-integral-derivative (PID) compensator configured to process the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, the PID compensator having an output for outputting a processed difference signal; and a digital sigma-delta modulator coupled to the PID compensator output configured to (i) generate at least one switching element control signal in response to the processed difference signal and (ii) output the at least one switching element control signal to a control input of at least one of the at least two switching elements for controlling a respective switching element of the DC-DC converter, wherein the first input is configured to receive the analog reference voltage signal, and the second input is configured to receive the analog feedback voltage signal, the comparator further having an output for outputting a comparator output signal that is produced by the comparator in response to the first and second inputs, wherein the flip-flop has an input for receiving the comparator output signal, the flip-flop further having an output for outputting a sampled signal that is generated by the flip-flop in response to the received comparator output signal, and wherein the multiplexer is configured to multiplex, in response to the sampled signal, quantization values on an output of the multiplexer, wherein multiplexing the quantization values converts the sampled signal which corresponds to an unsigned signal of 0's and 1's into a two's complement signal, wherein the two's complement signal comprises the difference signal for processing by the PID compensator.

2. The digital controller of claim 1, wherein the at least two switching elements comprise first and second switching elements controllable via first and second control signals, respectively, the digital controller further comprising:

a pulse generator coupled between the output of the digital sigma-delta modulator and a respective control input of the first and second switching elements, wherein responsive to the output of the digital sigma-delta modulator, the pulse generator is configured to generate the first and second control signals for controlling the first and second switching elements, respectively, of the DC-DC converter.

3. The digital controller of claim 1, wherein the digital controller is configured to control a switch-mode DC-DC converter that comprises one selected from the group consisting of a buck, boost, buck-boost, and cuk DC-DC converter.

4. The digital controller of claim 1, wherein the PID compensator includes a transfer function having first and second real zeros configured to stabilize the feedback loop regardless of load variations that can occur on the DC-DC converter output, the first real zero being located before a resonant frequency of the LC circuit and the second real zero being located after the resonant frequency of the LC circuit.

5. A method of digitally controlling a switch-mode DC-DC converter, the DC-DC converter having at least two switching elements and an LC circuit for producing an output voltage on an output of the DC-DC converter that is maintained at a desired level regardless of load changes that can occur on the output, the method comprising:

producing, via an input stage, a difference signal between a reference voltage ($V_{ref}$) and a feedback voltage ($V_{fbk}$) in a feedback loop of the DC-DC converter representative of the output voltage, wherein the reference voltage ($V_{ref}$) comprises an analog reference voltage signal and wherein the feedback voltage ($V_{fbk}$) comprises an analog feedback voltage signal, wherein producing the difference signal via the input stage comprises producing the difference signal via a comparator with first and second inputs, a flip-flop, and a multiplexer;

processing, via a proportional-integral-derivative (PID) compensator, the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, wherein processing further comprises outputting, via an output of the PID compensator, a processed difference signal; and generating, via a digital sigma-delta modulator coupled to the PID compensator output, at least one switching element control signal in response to the processed difference signal, wherein generating further comprises outputting, via an output of the digital sigma-delta modulator, the at least one switching element control signal to at least one of the at least two switching elements for controlling a respective switching element of the DC-DC converter, wherein producing the difference signal comprises receiving, via the first and second inputs of the comparator, the analog reference voltage signal and the analog feedback voltage signal, and producing, via the comparator, a comparator output signal in response to the first and second inputs, receiving, via an input of the flip-flop, the comparator output signal, and generating, via the flip-flop, a sampled signal in response to the received comparator output signal, and multiplexing, via the multiplexer, in response to the sampled signal, quantization values on an output of the multiplexer, wherein multiplexing the quantization values converts the sampled signal which corresponds to an unsigned signal of 0's and 1's into a two's complement signal, wherein the two's complement signal comprises the difference signal for processing by the PID compensator.

6. The method of claim 5, wherein the at least two switching elements comprise first and second switching elements controllable via first and second control signals, respectively, the method further comprising:

generating, via a pulse generator coupled between the output of the digital sigma-delta modulator and the first and second switching elements, the first and second control signals in response to the output of the digital sigma-delta modulator, the first and second control signals for controlling the first and second switching elements, respectively, of the DC-DC converter.

7. The method of claim 5, wherein the switch-mode DC-DC converter comprises one selected from the group consisting of a buck, boost, buck-boost, and cuk DC-DC converter.

8. The method of claim 5, wherein processing, via the PID compensator, comprises processing via a PID compensator that includes a transfer function having first and second real zeros configured to stabilize the feedback loop regardless of load variations that can occur on the DC-DC converter output, the first real zero being located before a resonant frequency of the LC circuit and the second real zero being located after the resonant frequency of the LC circuit.

9. A switch-mode DC-DC converter comprising:
at least two switching elements, wherein at least one of the at least two switching elements is configured to switch in response to a switching element control signal;
an LC circuit coupled to the at least two switching elements for producing an output voltage on an output of the DC-DC converter in response to switching of the at least two switching elements; and
a digital controller, wherein the digital controller comprises:
(a) an input stage for producing a difference signal between a reference voltage ($V_{ref}$) and a feedback voltage ($V_{fbk}$) in a feedback loop of the DC-DC converter representative of the output voltage, wherein the reference voltage ($V_{ref}$) comprises an analog reference voltage signal and wherein the feedback voltage ($V_{fbk}$) comprises an analog feedback voltage signal, wherein the input stage comprises a comparator with first and second inputs, a flip-flop, and a multiplexer;
(b) a proportional-integral-derivative (PID) compensator for processing the difference signal to stabilize the feedback loop by compensating for an undesired phase shift introduced in the DC-DC converter output voltage by the LC circuit for large variations on a load on the output of the DC-DC converter, the load variations ranging from no load to just more than zero ohms, the PID compensator having an output for outputting a processed difference signal; and
(c) a digital sigma-delta modulator coupled to the PID compensator output for (i) generating at least one switching element control signal in response to the processed difference signal and (ii) outputting the at least one switching element control signal to a control input of the at least one of the at least two switching elements for controlling a respective switching element of the DC-DC converter,
wherein the first input is configured to receive the analog reference voltage signal, and the second input is configured to receive the analog feedback voltage signal, the comparator further having an output for outputting a comparator output signal that is produced by the comparator in response to the first and second inputs,
wherein the flip-flop has an input for receiving the comparator output signal, the flip-flop further having an output for outputting a sampled signal that is generated by the flip-flop in response to the received comparator output signal, and
wherein the multiplexer is configured to multiplex, in response to the sampled signal, quantization values on an output of the multiplexer, wherein multiplexing the quantization values converts the sampled signal which corresponds to an unsigned signal of 0's and 1's into a two's complement signal, wherein the two's complement signal comprises the difference signal for processing by the PID compensator.

10. The switch-mode DC-DC converter of claim 9, further comprising one selected from the group consisting of a buck, boost, buck-boost, and cuk DC-DC converter.

11. The switch-mode DC-DC converter of claim 9, wherein the at least two switching elements comprise first and second switching elements controllable via first and second control signals, respectively, wherein the digital controller further comprises:
(d) a pulse generator coupled between the output of the digital sigma-delta modulator and a respective control input of the first and second switching elements, wherein responsive to the output of the digital sigma-delta modulator, the pulse generator is configured to generate the first and second control signals for controlling the first and second switching elements, respectively, of the DC-DC converter.

12. The switch-mode DC-DC converter of claim 9, wherein the PID compensator includes a transfer function having first and second real zeros configured to stabilize the feedback loop regardless of load variations that can occur on the DC-DC converter output, the first real zero being located before a resonant frequency of the LC circuit and the second real zero being located after the resonant frequency of the LC circuit.

* * * * *